US010706084B2

(12) United States Patent
Zhao et al.

(10) Patent No.: US 10,706,084 B2
(45) Date of Patent: Jul. 7, 2020

(54) METHOD AND DEVICE FOR PARSING QUESTION IN KNOWLEDGE BASE

(71) Applicants: HUAWEI TECHNOLOGIES CO., LTD., Shenzhen, Guangdong (CN); Institute of Automation, Chinese Academy of Sciences, Beijing (CN)

(72) Inventors: Jun Zhao, Beijing (CN); Kang Liu, Beijing (CN); Shizhu He, Beijing (CN); Yibo Zhang, Shenzhen (CN)

(73) Assignees: Huawei Technologies Co., Ltd., Shenzhen (CN); Institute of Automation, Chinese Academy of Sciences, Beijing (CN)

( * ) Notice: Subject to any disclaimer, the term of this patent is extended or adjusted under 35 U.S.C. 154(b) by 699 days.

(21) Appl. No.: 15/472,279

(22) Filed: Mar. 29, 2017

(65) Prior Publication Data

US 2017/0199928 A1 Jul. 13, 2017

Related U.S. Application Data

(63) Continuation of application No. PCT/CN2015/078362, filed on May 6, 2015.

(30) Foreign Application Priority Data

Sep. 29, 2014 (CN) .......................... 2014 1 0513189

(51) Int. Cl.
*G06F 16/00* (2019.01)
*G06F 16/332* (2019.01)
(Continued)

(52) U.S. Cl.
CPC ........ *G06F 16/3329* (2019.01); *G06F 16/243* (2019.01); *G06F 16/24522* (2019.01);
(Continued)

(58) Field of Classification Search
CPC . G06N 20/00; G06F 16/243; G06F 16/24522; G06F 40/289; G06F 16/3329
See application file for complete search history.

(56) References Cited

U.S. PATENT DOCUMENTS 9,183,511 B2 * 11/2015 Li .......................... G06N 20/00
2002/0111951 A1 * 8/2002 Zeng ...................... G06F 40/205
(Continued)

FOREIGN PATENT DOCUMENTS

CN  101079025 A  11/2007
CN  101118554 A  2/2008
(Continued)

OTHER PUBLICATIONS

Shizhu He et al;"CASIA@V2: A MLN-based Question Answering System over Linked Data", CLEF 2014 Labs and Workshops, Notebook Papers. CEUR Workshop Proceedings (ceur-ws.org), ISSN 1613-0073, Sep. 8, 2014, pp. 1249-1259, XP055411695.
(Continued)

*Primary Examiner* — Cheryl Lewis
(74) *Attorney, Agent, or Firm* — Leydig, Voit & Mayer, Ltd.

(57) ABSTRACT

A method for parsing a question in a knowledge base includes: receiving a question entered by a user; performing phrase detection on the question to determine candidate phrases; mapping the candidate phrases to resource items in the knowledge base; further determining values of observed predicates and possible question parse spaces; performing uncertain inference on each proposition set in the possible question parse spaces according to the values of the observed predicates and values of hidden predicates, and calculating confidence; acquiring a combination of true propositions in a proposition set whose confidence satisfies
(Continued)

a preset condition; generating a formal query statement according to the combination of true propositions.

20 Claims, 6 Drawing Sheets

(51) Int. Cl.
G06N 20/00 (2019.01)
G06F 16/242 (2019.01)
G06F 16/901 (2019.01)
G06F 16/2457 (2019.01)
G06N 5/04 (2006.01)
G06F 16/2452 (2019.01)
G06F 40/268 (2020.01)
G06F 40/289 (2020.01)
G06F 17/11 (2006.01)
G06N 7/00 (2006.01)

(52) U.S. Cl.
CPC .... *G06F 16/24578* (2019.01); *G06F 16/9024* (2019.01); *G06F 17/11* (2013.01); *G06F 40/268* (2020.01); *G06F 40/289* (2020.01); *G06N 5/04* (2013.01); *G06N 20/00* (2019.01); *G06N 7/005* (2013.01)

(56) References Cited

U.S. PATENT DOCUMENTS

| | | | |
|---|---|---|---|
| 2006/0053000 A1 | 3/2006 | Moldovan et al. | |
| 2007/0112746 A1 | 5/2007 | Todhunter | |
| 2010/0211533 A1 | 8/2010 | Yang et al. | |
| 2011/0004582 A1 | 1/2011 | Hu | |
| 2013/0018652 A1 | 1/2013 | Ferrucci et al. | |
| 2015/0019541 A1* | 1/2015 | Carus | G06F 16/93 707/723 |
| 2016/0314394 A1 | 10/2016 | Sun et al. | |

FOREIGN PATENT DOCUMENTS

| | | |
|---|---|---|
| CN | 101510221 A | 8/2009 |
| CN | 101566998 A | 10/2009 |
| CN | 101599072 A | 12/2009 |
| CN | 102279875 A | 12/2011 |
| CN | 102306144 A | 1/2012 |
| CN | 102346756 A | 2/2012 |
| CN | 103500208 A | 1/2014 |
| CN | 103678576 A | 3/2014 |
| CN | 103679273 A | 3/2014 |
| CN | 103699689 A | 4/2014 |
| CN | 104050157 A | 9/2014 |
| EP | 2051174 A1 | 4/2009 |
| EP | 2622599 A1 | 8/2013 |
| WO | 2010137940 A1 | 12/2010 |

OTHER PUBLICATIONS

Kennington Casey et al : "Situated incremental natural language understanding using Markov Logic Networks", Computer Speech and Language ,vol. 28, No. 1, Jul. 2, 2013, pp. 240-255, XP028733075.
Mohamed Yahya et al. Natural Language Questions for the Web of Data. Association for Computational Linguistics. Jul. 12-14, 2012. total 12 pages.
Jonathan Berant et al. Semantic Parsing on Freebase from Question-Answer Pairs. EMNLP, 2013. total 12 pages.
Christina Unger et al. Template-based Question Answering over RDF Data. WWW 2012—Session: Ontology Representation and Querying: RDF and SPARQLApr. 16-20, 2012. total 10 pages.

* cited by examiner

METHOD AND DEVICE FOR PARSING QUESTION IN KNOWLEDGE BASE

CROSS-REFERENCE TO RELATED APPLICATIONS

This application is a continuation of International Application No. PCT/CN2015/078362, filed on May 6, 2015, which claims priority to Chinese Patent Application No. 201410513189.4, filed on Sep. 29, 2014. The disclosures of the aforementioned applications are hereby incorporated by reference in their entireties.

STATEMENT OF JOINT RESEARCH AGREEMENT

The subject matter and the claimed invention were made by or on the behalf of Institute of Automation, Chinese Academy of Sciences, of Haidian District, Beijing, P. R. China, and Huawei Technologies Co., Ltd., of Shenzhen, Guangdong Province, P. R. China, under a joint research agreement titled "REAL KNOWLEDGE EXTRACTION AND CONSTRUCTION OF KNOWLEDGE BASE". The joint research agreement was in effect on or before the claimed invention was made, and that the claimed invention was made as a result of activities undertaken within the scope of the joint research agreement.

TECHNICAL FIELD

Embodiments of the present application relate to the field of data processing, and more specifically, to a method and a device for parsing a question in a knowledge base.

BACKGROUND

A knowledge base (KB) is a structured, organized, and comprehensive knowledge cluster that is easy to operate and easy to use in knowledge engineering. It is a set of interlinked knowledge fragments that are stored, organized, managed, and used in a computer storage in one or several knowledge representation forms according to requirements for question answering in one or several fields.

Currently, a large quantity of knowledge resources and knowledge communities have emerged on the Internet, for example, Wikipedia, Baidu Encyclopedia (http://baike.baidu.com/), and Interactive Encyclopedia (http://www.baike.com/). From these knowledge resources, large-scale knowledge bases centering on entities and entity relations have been mined through research. In addition, there are also knowledge bases in some fields, for example, weather knowledge bases and food knowledge bases.

Building of knowledge bases experiences a process from addition by using artificial or collective intelligence to automatic acquisition oriented to the entire Internet by using machine learning and information extraction technologies. Earlier knowledge bases are built by experts manually, for example, WordNet, CYC, CCD, HowNet, and Encyclopedia of China. However, with development of information technologies, disadvantages such as small scales, a small amount of knowledge, and slow update of conventional knowledge bases built manually are exposed gradually. In addition, a certainty knowledge framework built by experts also cannot satisfy requirements for large-scale computing in a noisy environment on the Internet. This is also one of reasons why a CYC project finally fails. With fast development of Web 2.0, a large quantity of collective intelligence-based web knowledge bases including Wikipedia, Baidu Encyclopedia, and Interactive Encyclopedia emerge. Based on these network resources, many automatic and semi-automatic knowledge base building methods are used to build large-scale available knowledge bases, such as YAGO, DBpedia, and Freebase.

Based on these knowledge bases, knowledge base-based question answering systems may be built. Compared with retrieval technology-based question answering systems, the knowledge base-based question answering systems may have lower question coverage due to limited knowledge base scale, but they may have certain inference capabilities. In addition, in limited fields, a higher accuracy may be achieved. Therefore, some knowledge base-based question answering systems are developed as the times require, where some have become independent applications, and some are used as enhanced functions of an existing product, for example, Siri of Apple and Knowledge Graph of Google.

A question answering system does not require a user to break down a question into keywords. Instead, the question is submitted in a natural language form. After the question of the user is processed by the question answering system, an answer corresponding to the question of the user is quickly searched out from a knowledge base or the Internet, and then the answer instead of a related web page is directly returned to the user. Therefore, the question answering system greatly reduces use difficulties for the user, and it is more convenient and efficient than conventional search engines such as keyword search and semantic search technologies.

Evaluation campaigns of question answering over linked data (QALD) have promoted the development of the question answering system. An objective of the QALD is to convert a natural language question into a structured Simple Protocol and Resource Description Framework (RDF) Query Language (Simple Protocol and RDF Query Language, SPARQL) for large-scale structured linked data, and thereby establishing a friendly natural language query interface. Converting the natural language question into the structured SPARQL needs to depend on a conversion rule for a knowledge base. However, in the current question answering systems, all conversion rules are configured manually, which causes not only huge labor consumption, but also poor field extensibility.

SUMMARY

Embodiments of the present application provide a method for parsing a question based on a knowledge base. The method is field-independent, and manually configuring a conversion rule is not required.

According to a first aspect, a method for parsing a question in a knowledge base is provided and includes:
receiving a question entered by a user;
performing phrase detection on the question to determine first candidate phrases;
mapping the first candidate phrases to first resource items in the knowledge base, where the first resource items have consistent semantic meanings with the first candidate phrases;
determining values of observed predicates and possible question parse spaces according to the first candidate phrases and the first resource items, where the observed predicates are used to indicate features of the first candidate phrases, features of the first resource items, and a relationship between the first candidate phrases and the first resource items, points in the possible question parse spaces are proposition sets, and truth or falsity of propositions in the proposition sets are represented by values of hidden predicates;

performing uncertain inference on each proposition set in the possible question parse spaces according to the values of the observed predicates and the values of the hidden predicates, and calculating confidence of each proposition set;

acquiring a combination of true propositions in a proposition set whose confidence satisfies a preset condition, where the true propositions are used to indicate search phrases selected from the first candidate phrases, search resource items selected from the first resource items, and features of the search resource items; and generating a formal query statement according to the combination of true propositions.

With reference to the first aspect, in a first possible implementation manner of the first aspect, the uncertain inference is based on a Markov logic network (MLN), where the MLN includes a predefined first-order formula and a weight of the first-order formula.

With reference to the first aspect or the first possible implementation manner of the first aspect, in a second possible implementation manner of the first aspect, before the receiving a question entered by a user, the method further includes:

acquiring multiple natural language questions from the knowledge base;

performing phrase detection on the multiple natural language questions to determine second candidate phrases of the multiple natural language questions;

mapping the second candidate phrases to second resource items in the knowledge base, where the second resource items have consistent semantic meanings with the second candidate phrases;

determining, according to the second candidate phrases and the second resource items, values of observed predicates corresponding to the multiple natural language questions;

acquiring hand-labeled values of hidden predicates corresponding to the multiple natural language questions; and creating an undirected graph according to the values of the observed predicates corresponding to the multiple natural language questions, the values of the hidden predicates corresponding to the multiple natural language questions, and the first-order formula, and determining the weight of the first-order formula through training.

With reference to the second possible implementation manner of the first aspect, in a third possible implementation manner of the first aspect, the first-order formula includes a Boolean formula and a weighted formula, a weight of the Boolean formula is +∞, a weight of the weighted formula is a weighted formula weight, and the hand-labeled values of the hidden predicates corresponding to the multiple natural language questions satisfy the Boolean formula; and the creating an undirected graph according to the values of the observed predicates corresponding to the multiple natural language questions, the values of the hidden predicates corresponding to the multiple natural language questions, and the first-order formula, and determining the weight of the first-order formula through training includes:

creating the undirected graph according to the values of the observed predicates corresponding to the multiple natural language questions, the values of the hidden predicates corresponding to the multiple natural language questions, and the first-order formula, and determining the weight of the weighted formula through training.

With reference to the second possible implementation manner of the first aspect, in a fourth possible implementation manner of the first aspect, the creating an undirected graph according to the values of the observed predicates corresponding to the multiple natural language questions, the values of the hidden predicates corresponding to the multiple natural language questions, and the first-order formula, and determining the weight of the first-order formula through training includes:

creating the undirected graph according to the values of the observed predicates corresponding to the multiple natural language questions, the values of the hidden predicates corresponding to the multiple natural language questions, and the first-order formula, and determining the weight of the first-order formula by using a margin infused relaxed algorithm (MIRA).

With reference to any possible implementation manner of the first aspect, in a fifth possible implementation manner of the first aspect, the MLN is indicated by M, the first-order formula is indicated by $\phi_i$, the weight of the first-order formula is indicated by $w_i$, and the proposition set is indicated by y; and the performing uncertain inference on each proposition set in the possible question parse spaces according to the values of the observed predicates and the values of the hidden predicates, and calculating confidence of each proposition set includes:

calculating the confidence of each proposition set according to $$p(y) = \frac{1}{Z}\exp\left(\sum_{(\phi_i, w_i) \in M} w_i \sum_{c \in C^{n\phi_i}} f_c^{\phi_i}(y)\right);$$

where

Z is a normalization constant, $C^{n\phi_i}$ is a sub-formula set corresponding to the first-order formula $\phi_i$, c is a sub-formula in the sub-formula set $C^{n\phi_i}$, $f_c^{\phi_i}$ is a binary feature function, and $f_c^{\phi_i}(y)$ indicates truth or falsity of the first-order formula in the proposition set y.

With reference to the first aspect or any possible implementation manner of the first aspect, in a sixth possible implementation manner of the first aspect, the acquiring a combination of true propositions in a proposition set whose confidence satisfies a preset condition includes:

determining a proposition set whose confidence value is largest, and acquiring a combination of true propositions in the proposition set whose confidence value is largest.

With reference to the first aspect or any possible implementation manner of the first aspect, in a seventh possible implementation manner of the first aspect:

the features of the first candidate phrases include positions of the first candidate phrases in the question, parts of speech of head words of the first candidate phrases, and tags on a dependency path between every two of the first candidate phrases;

the features of the first resource items include types of the first resource items, a correlation value between every two of the first resource items, and a parameter matching relationship between every two of the first resource items;

the relationship between the first candidate phrases and the first resource items includes prior matching scores between the first candidate phrases and the first resource items; and the determining values of observed predicates according to the first candidate phrases and the first resource items includes:

determining the positions of the first candidate phrases in the question;

determining the parts of speech of the head words of the first candidate phrases by using a Stanford part-of-speech tagging tool;

determining the tags on the dependency path between every two of the first candidate phrases by using a Stanford dependency syntax parser tool;

determining the types of the first resource items from the knowledge base, where the types are entity or class or relation;

determining the parameter matching relationship between every two of the first resource items from the knowledge base;

using a similarity coefficient between every two of the first resource items as the correlation value between every two of the first resource items; and calculating the prior matching scores between the first candidate phrases and the first resource items, where the prior matching scores are used to indicate probabilities that the first candidate phrases are mapped to the first resource items.

With reference to the first aspect or any possible implementation manner of the first aspect, in an eighth possible implementation manner of the first aspect, the formal query statement is a Simple Protocol and Resource Description Framework Query Language (SPARQL).

With reference to the eighth possible implementation manner of the first aspect, in a ninth possible implementation manner of the first aspect, the generating a formal query statement according to the combination of true propositions includes:

generating the SPARQL according to the combination of true propositions by using a SPARQL template.

With reference to the ninth possible implementation manner of the first aspect, in a tenth possible implementation manner of the first aspect, the SPARQL template includes an ASK WHERE template, a SELECT COUNT (?url) WHERE template, and a SELECT ?url WHERE template; and the generating the SPARQL according to the combination of true propositions by using a SPARQL template includes:

when the question is a Yes/No question, generating the SPARQL according to the combination of true propositions by using the ASK WHERE template;

when the question is a Normal question, generating the SPARQL according to the combination of true propositions by using the SELECT ?url WHERE template; and when the question is a Numeric question, generating the SPARQL according to the combination of true propositions by using the SELECT ?url WHERE template, or when a numeric answer cannot be obtained for the SPARQL generated by using the SELECT ?url WHERE template, generating the SPARQL by using the SELECT COUNT (?url) WHERE template.

With reference to the first aspect or any possible implementation manner of the first aspect, in an eleventh possible implementation manner of the first aspect, the performing phrase detection on the question to determine first candidate phrases includes: using word sequences in the question as the first candidate phrases, where the word sequences satisfy:

all consecutive non-stop words in the word sequence begin with a capital letter, or if all consecutive non-stop words in the word sequence do not begin with a capital letter, a length of the word sequence is less than four;

a part of speech of a head word of the word sequence is jj or nn or rb or vb, where jj is an adjective, nn is a noun, rb is an adverb, and vb is a verb; and all words included in the word sequence are not stop words.

According to a second aspect, a device for parsing a question is provided and includes:

a receiving unit, configured to receive a question entered by a user;

a phrase detection unit, configured to perform phrase detection on the question received by the receiving unit to determine first candidate phrases;

a mapping unit, configured to map the first candidate phrases determined by the phrase detection unit to first resource items in the knowledge base, where the first resource items have consistent semantic meanings with the first candidate phrases;

a first determining unit, configured to determine values of observed predicates and possible question parse spaces according to the first candidate phrases and the first resource items, where the observed predicates are used to indicate features of the first candidate phrases, features of the first resource items, and a relationship between the first candidate phrases and the first resource items, points in the possible question parse spaces are proposition sets, and truth or falsity of propositions in the proposition sets are represented by values of hidden predicates;

a second determining unit, configured to: perform uncertain inference on each proposition set in the possible question parse spaces according to the values that are of the observed predicates and are determined by the first determining unit and the values of the hidden predicates, and calculate confidence of each proposition set;

an acquiring unit, configured to acquire a combination of true propositions in a proposition set that is determined by the second determining unit and whose confidence satisfies a preset condition, where the true propositions are used to indicate search phrases selected from the first candidate phrases, search resource items selected from the first resource items, and features of the search resource items; and a generating unit, configured to generate a formal query statement according to the combination of true propositions.

With reference to the second aspect, in a first possible implementation manner of the second aspect, the uncertain inference is based on a Markov logic network (MLN), where the MLN includes a predefined first-order formula and a weight of the first-order formula.

With reference to the second aspect or the first possible implementation manner of the second aspect, in a second possible implementation manner of the second aspect:

the acquiring unit is further configured to acquire multiple natural language questions from the knowledge base;

the phrase detection unit is further configured to perform phrase detection on the question received by the acquiring unit to determine the first candidate phrases;

the mapping unit is further configured to map the second candidate phrases to second resource items in the knowledge base, where the second resource items have consistent semantic meanings with the second candidate phrases;

the first determining unit is further configured to determine, according to the second candidate phrases and the second resource items, values of observed predicates corresponding to the multiple natural language questions;

the acquiring unit is further configured to acquire hand-labeled values of hidden predicates corresponding to the multiple natural language questions; and the second determining unit is further configured to create an undirected graph according to the values of the observed predicates corresponding to the multiple natural language questions, the values of the hidden predicates corresponding to the multiple natural language questions, and the first-order formula, and determine the weight of the first-order formula through training.

With reference to the second possible implementation manner of the second aspect, in a third possible implementation manner of the second aspect, the first-order formula includes a Boolean formula and a weighted formula, a weight of the Boolean formula is +∞, a weight of the weighted formula is a weighted formula weight, and the hand-labeled values of the hidden predicates corresponding to the multiple natural language questions satisfy the Boolean formula; and the second determining unit is specifically configured to:
create the undirected graph according to the values of the observed predicates corresponding to the multiple natural language questions, the values of the hidden predicates corresponding to the multiple natural language questions, and the first-order formula, and determine the weight of the weighted formula through training.

With reference to the second possible implementation manner of the second aspect, in a fourth possible implementation manner of the second aspect, the second determining unit is specifically configured to:
create the undirected graph according to the values of the observed predicates corresponding to the multiple natural language questions, the values of the hidden predicates corresponding to the multiple natural language questions, and the first-order formula, and determine the weight of the first-order formula by using a margin infused relaxed algorithm (MIRA).

With reference to any possible implementation manner of the second aspect, in a fifth possible implementation manner of the second aspect, the MLN is indicated by M, the first-order formula is indicated by $\phi_i$, the weight of the first-order formula is indicated by $w_i$, and the proposition set is indicated by y; and the second determining unit is specifically configured to:
create a possible world according to the values of the observed predicates and the hidden predicates, where the possible world is indicated by y; and
calculate the confidence of each proposition set according to $$p(y) = \frac{1}{Z} \exp\left( \sum_{(\phi_i, w_i) \in M} w_i \sum_{c \in C^{n\phi_i}} f_c^{\phi_i}(y) \right);$$

where

Z is a normalization constant, $C^{n\phi_i}$ is a sub-formula set corresponding to the first-order formula $\phi_i$, c is a sub-formula in the sub-formula set $C^{n\phi_i}$, $f_c^{\phi_i}$ is a binary feature function, and $f_c^{\phi_i}(y)$ indicates truth or falsity of the first-order formula in the proposition set y.

With reference to the second aspect or any possible implementation manner of the second aspect, in a sixth possible implementation manner of the second aspect, the acquiring unit is specifically configured to:
determine a proposition set whose confidence value is largest, and acquire a combination of true propositions in the proposition set whose confidence value is largest.

With reference to the second aspect or any possible implementation manner of the second aspect, in a seventh possible implementation manner of the second aspect,
the features of the first candidate phrases include positions of the first candidate phrases in the question, parts of speech of head words of the first candidate phrases, and tags on a dependency path between every two of the first candidate phrases;
the features of the first resource items include types of the first resource items, a correlation value between every two of the first resource items, and a parameter matching relationship between every two of the first resource items;
the relationship between the first candidate phrases and the first resource items includes prior matching scores between the first candidate phrases and the first resource items; and
the first determining unit is specifically configured to:
determine the positions of the first candidate phrases in the question;
determine the parts of speech of the head words of the first candidate phrases by using a Stanford part-of-speech tagging tool;
determine the tags on the dependency path between every two of the first candidate phrases by using a Stanford dependency syntax parser tool;
determine the types of the first resource items from the knowledge base, where the types are entity or class or relation;
determine the parameter matching relationship between every two of the first resource items from the knowledge base;
use a similarity coefficient between every two of the first resource items as the correlation value between every two of the first resource items; and
calculate the prior matching scores between the first candidate phrases and the first resource items, where the prior matching scores are used to indicate probabilities that the first candidate phrases are mapped to the first resource items.

With reference to the second aspect or any possible implementation manner of the second aspect, in an eighth possible implementation manner of the second aspect, the formal query statement is a Simple Protocol and Resource Description Framework Query Language (SPARQL).

With reference to the eighth possible implementation manner of the second aspect, in a ninth possible implementation manner of the second aspect, the generating unit is specifically configured to:
generate the SPARQL according to the combination of true propositions by using a SPARQL template.

With reference to the ninth possible implementation manner of the second aspect, in a tenth possible implementation manner of the second aspect, the SPARQL template includes an ASK WHERE template, a SELECT COUNT (?url) WHERE template, and a SELECT ?url WHERE template; and the generating unit is specifically configured to:
when the question is a Yes/No question, generate the SPARQL according to the combination of true propositions by using the ASK WHERE template;
when the question is a Normal question, generate the SPARQL according to the combination of true propositions by using the SELECT ?url WHERE template; and
when the question is a Numeric question, generate the SPARQL according to the combination of true propositions by using the SELECT ?url WHERE template, or when a numeric answer cannot be obtained for the SPARQL generated by using the SELECT ?url WHERE template, generate the SPARQL by using the SELECT COUNT (?url) WHERE template.

With reference to the second aspect or any possible implementation manner of the second aspect, in an eleventh possible implementation manner of the second aspect, the phrase detection unit is specifically configured to:
use word sequences in the question as the first candidate phrases, where the word sequences satisfy:
all consecutive non-stop words in the word sequence begin with a capital letter, or if all consecutive non-stop words in the word sequence do not begin with a capital letter, a length of the word sequence is less than four;
a part of speech of a head word of the word sequence is jj or nn or rb or vb, where jj is an adjective, nn is a noun, rb is an adverb, and vb is a verb; and
all words included in the word sequence are not stop words.

The embodiments of the present application are based on a predefined uncertain inference network, and can be used for converting a natural language question entered by a user into a structured SPARQL. In the embodiments of the present application, the predefined uncertain inference network can be applied to a knowledge base in any field, and has field extensibility. Therefore, it is unnecessary to manually configure a conversion rule for a knowledge base.

BRIEF DESCRIPTION OF DRAWINGS

The following briefly introduces the accompanying drawings used in describing the embodiments.

DESCRIPTION OF EMBODIMENTS

Figure 1:
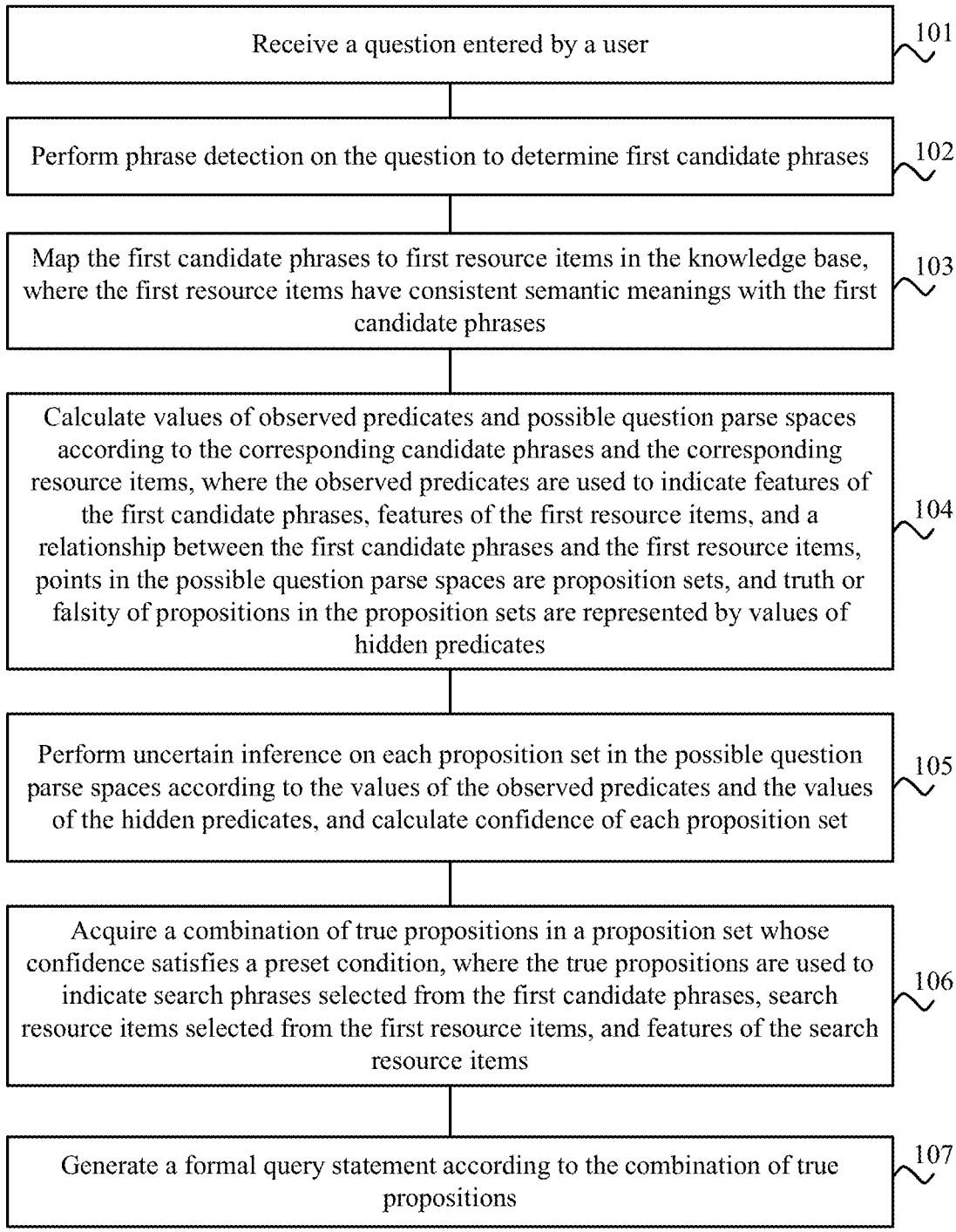
FIG. 1 is a flowchart of a method for parsing a question in a knowledge base according to an embodiment of the present application.

In a knowledge base-based question answering system, a natural language question needs to be converted into a formal query statement. For example, the formal query statement is in a structured query language (SQL) statement or a simple protocol and resource description framework (RDF) query language (SPARQL) statement. Generally, a SPARQL statement is expressed in a subject-property-object (SPO) triple format.

For example, a SPARQL statement corresponding to a natural language question "Which software has been developed by organization founded in California, USA?" is:
?url_answer rdf:type dbo: Software
?url_answer db:developer ?x1
?x1 rdf:type dbo:Company
?x1 dbo:foundationPlace dbr:California Converting a natural language question into a formal query statement needs to depend on a conversion rule specific to a knowledge base. That is, conversion rules corresponding to different knowledge bases are different. However, in a current question answering system, it is necessary to manually configure a conversion rule for each knowledge base. For a knowledge base, some questions are collected manually, and answers to the questions are determined. Some rules are obtained through manual summarization according to these questions, and these rules are used as the conversion rules. That is, the manually configured conversion rules do not have field extensibility, and a conversion rule configured for one knowledge base cannot be used for another knowledge base. In addition, because many ambiguities exist in natural language questions, the manually configured conversion rules lack robustness.

Natural language processing (NLP) is a tool for describing a relationship between a machine language and a natural language in computing science, artificial intelligence, and linguistic disciplines. The NLP involves human-machine interactions. Tasks of the NLP may include: automatic monitoring (automatic summarization), coreference resolution, discourse analysis, machine translation, morphological segmentation, named entity recognition (NER), natural language generation, natural language understanding, optical character recognition (OCR), part-of-speech tagging, syntax parsing, question answering, relationship extraction, sentence breaking, sentiment analysis, speech recognition, speech segmentation), topic segmentation and recognition, word segmentation, word sense disambiguation, information retrieval (IR), information extraction (IE), speech processing, and the like.

Specifically, a Stanford natural language processing (NLP) tool is designed for different tasks of the NLP. The Stanford NLP tool is used in the embodiments of the present application. For example, a part-of-speech tagging tool in the Stanford NLP tool may be used to determine a part of speech of each word in a question.

Uncertain inference generally refers to various kind of inferences other than precise inference, including inference of incomplete and inaccurate knowledge, inference of vague knowledge, non-monotonic inference, and the like.

An uncertain inference process is actually a process of thinking that starts from uncertain original evidence and, finally infers, by using uncertainty knowledge, a structure that has uncertainty but is reasonable or basically reasonable.

Types of uncertain inference include numeric methods and nonnumeric methods. The numeric methods include probability-based methods. Specifically, a probability-based method is a method developed on the basis of probability theory-related theories, such as confidence method, subjective Bayes method, and theory of evidence.

A Markov logic network is a common one of uncertain inference networks.

The Markov logic network (MLN) is a statistical relational learning framework that combines first-order logic (FOL) and statistical relational learning of a Markov network. A difference between the Markov logic network and the conventional first-order logic is that the conventional first-order logic requires that no conflict should exist among all rules. If one proposition cannot satisfy all rules simultaneously, the proposition is false. In the Markov logic network, however, each rule has a weight, and a proposition is true according to a probability.

The first-order logic (FOL) may also be referred to as predicate logic or first-order predicate logic. It is formed by several first-order predicate rules. A first-order predicate rule is formed by symbols of four types, which are constant, variable, function, and predicate. A constant is a simple object in a domain. A variable may be several objects in a domain. A function represents a mapping from a group of objects to one object. A predicate is a relationship between several objects in the domain, or a property of an object. The variable and constant may have types. A variable of a type can have a value only from an object set that defines the type. A term may be any expression that indicates an object. An atom is a predicate that is effective on a group of terms. A constant term is a term without a variable. A ground atom or a ground predicate is an atom or a predicate whose parameters are all constant terms. Generally, a rule is established recursively from atoms by using connectors (such as an implication relationship and an equivalence relationship) and quantifiers (such as universal quantifiers and existential quantifiers). In the first-order logic, a rule is generally expressed in a form of a subordinate clause. A possible world is a world in which true values are assigned to all possible ground atoms that may occur. The first-order logic may be considered as a series of hard rules established in a possible-world set, that is, if a world violates one of the rules, an existential probability of the world is zero.

A basic idea of the MLN is to relax those rigid rules, that is, when a world violates one of the rules, the world has a reduced possibility of existence, but it does not mean the existence of the world is impossible. The fewer rules the world violates, the higher possibility of existence the world has. Therefore, a specific weight is added to each rule, and the weight reflects a constraint on a possible world that satisfies the rule. If the weight of a rule is greater, a difference between a world that satisfies the rule and a world that does not satisfy the rule is greater.

In this manner, by designing different first-order logic formulas (high-order rule templates), the Markov logic network can be properly combined with language features and knowledge base constraints. Constraints of soft rules can be modeled by using a logic formula in the probability framework. In the Markov logic, a group of weighted formulas is called a Markov logic network.

Specifically, the MLN may include a first-order formula and a penalty. A penalty may be applied if a ground atom violates a corresponding first-order formula.

A first-order formula includes first-order predicates, logical connectors, and variables.

FIG. 1 is a flowchart of a method for parsing a question in a knowledge base according to an embodiment of the present application. The method as shown in FIG. 1 includes:

101. Receive a question entered by a user.

102. Perform phrase detection on the question to determine a set of first candidate phrases.

103. Map the set of first candidate phrases to a set of first resource items in the knowledge base, where the first resource items have consistent semantic meanings with the first candidate phrases.

104. According to the first candidate phrases and the first resource items, calculate values of a set of observed predicates and a possible question parse space, wherein the observed predicates are used to indicate features of the first candidate phrases, features of the first resource items, and a relationship between the first candidate phrases and the first resource items, wherein points in the possible question parse space form multiple proposition sets, and truth or falsity of propositions in the proposition sets are represented by values of hidden predicates.

105. Perform uncertain inference on each proposition set in the possible question parse space according to the values of the observed predicates and the values of the hidden predicates, and calculate a confidence degree of each proposition set.

106. Acquire a combination of true propositions in proposition sets whose confidence degree satisfies a preset condition, where the true propositions are used to indicate search phrases selected from the first candidate phrases, search resource items selected from the first resource items, and features of the selected search resource items.

107. Generate a formal query statement according to the combination of the true propositions.

In this embodiment of the present application, uncertain inference is performed by using observed predicates and hidden predicates, and a natural language question can be converted into a formal query statement. In addition, in this embodiment of the present application, the uncertain inference method can be used for any knowledge base in any field, and has field extensibility. Therefore, it is unnecessary to manually configure a conversion rule for a knowledge base.

Understandably, in this embodiment of the present application, the question entered by the user in step 101 is a natural language question.

For example, the natural language question is "Give me all actors who were born in Berlin."

Further, in step 102, a word (token) sequence may be generated through the phrase detection. Optionally, the word sequence in the question may be used as the first candidate phrases. A word sequence, which is also referred to as a multi-word sequence or a word sequence or a word item or an n-gram word sequence or n-gram(s), is a sequence formed by n consecutive words.

It may be understood that, in step 102, multiple first candidate phrases may be determined.

Optionally, in step 102, a word sequence that satisfies the following constraint may be used as a first candidate phrase:

(1) all consecutive non-stop words in the word sequence begin with a capital letter, or if all consecutive non-stop words in the word sequence do not begin with a capital letter, a length of the word sequence is less than four;

(2) a part of speech of a head word of the word sequence is jj or nn or rb or vb, where jj is an adjective, nn is a noun, rb is an adverb, and vb is a verb; and (3) all words included in the word sequence are not stop words.

In addition, all consecutive non-stop words beginning with a capital letter must be in a same word sequence.

It may be understood that in this embodiment of the present application, a head word may also be referred to as an important word or a main word or the like, and a symbol indicating a part of speech may be acquired from a part-of-speech tagging set.

For example, all consecutive non-stop words in "United States Court of Appeals for the District of Columbia Circuit" begin with a capital letter, and are a candidate phrase. It may be understood that a word sequence in which all consecutive non-stop words begin with a capital letter is generally a proper noun.

A length of a word sequence is a quantity of words included in the word sequence. For example, a length of a word sequence "born in" is 2.

A part of speech of each word may be determined by using a Stanford part-of-speech tagging tool.

For example, English stop words include "a", "an", "the", "that" and the like, and Chinese stop words include " 一个 ", "一些", "不但", and the like.

For example, in the question "Give me all actors who were born in Berlin", the determined first candidate phrases include: actors, who, born in, in, and Berlin.

Specifically, the first candidate phrases may be expressed in a form of Table 1, where the first column in Table 1 indicates phrase identifiers of the first candidate phrases.

TABLE 1

| 11 | actors |
| 12 | who |
| 13 | born in |
| 14 | in |
| 15 | Berlin |

In this embodiment of the present application, it may be understood that step 103 is to map each first candidate phrase to a first resource item in the knowledge base. In this embodiment of the present application, step 103 may also be referred to as phrase mapping. Specifically, one first candidate phrase may be mapped to multiple first resource items. Types of the first resource item may be entity or class or relation.

For example, assuming that the knowledge base is DBpedia, and step 103 is specifically:

mapping the first candidate phrases to entities. Considering that entities in DBpedia come from entity pages in Wikipedia, first, an anchor text, a redirection page, and a disambiguation page in Wikipedia are collected, and a corresponding dictionary between a first candidate phrase and an entity is created by using the anchor text, the redirection page, and the disambiguation page in Wikipedia. When the first candidate phrase matches a mention (mention) phrase of the entity, the entity is a first resource item that has a consistent semantic meaning with the first candidate phrase.

A first candidate phrase is mapped to a Class. Considering a case of variations of words, and in particular, synonyms, for example, phrases film, movie, and show may all be mapped to a class dbo:Film. First, all words in the first candidate phrase are converted in to a vector form by using a word2vec tool, where a vector form of a class in the knowledge base is a vector form of a label thereof (corresponding to an rdfs:label relation); then a cosine similarity between the first candidate phrase and each class in vectors is calculated; and finally, N classes with a maximum cosine similarity value are used as a first resource item that has a consistent semantic meaning with the first candidate phrase.

The word2vec tool is a tool for converting a word into a vector. For example, it may be a segment of open code developed and provided by Google. For details, reference may be made to contents at http://code.google.com/p/word2vec/.

The first candidate phrase is mapped to a relation, and relation patterns defined by PATTY and ReVerb are used as resources. First, alignments between relations in DBpedia and relation patterns defined by PATTY and ReVerb in instances are calculated, that is, statistics of instance pairs satisfying the relations in the relation patterns in DBpedia are collected. Then, if the first candidate phrase can match a relation pattern, a relation satisfying the relation pattern is used as a first resource item that has a consistent semantic meaning with the first candidate phrase.

For the relation patterns defined by PATTY and ReVerb, reference may be made to "Patty: a taxonomy of relational patterns with semantic types" published in EMNLP by Nakashole, etc. in 2012 and "Identifying relations for open information extraction" published in EMNLP by Fader, etc. in 2011.

In this manner, by performing step 103, the first candidate phrases may be mapped to the first resource items. Specifically, each first candidate phrase is mapped to at least one first resource item. In addition, the first candidate phrases and the first resource items having a mapping relationship have consistent semantic meanings.

If one first candidate phrase is mapped to multiple first resource items, it indicates that the first candidate phrase may be ambiguous.

For example, in step 103, it may be determined that the first candidate phrases actors, who, born in, in, and Berlin in the question "Give me all actors who were born in Berlin" are mapped to the first resource items shown in Table 2. In Table 2, the first column indicates the first candidate phrases, the second column indicates the first resource items, and the third column indicates identifiers of the first resource items. In addition, a first candidate phrase "in" is mapped to five first resource items.

TABLE 2

| actors | dbo: Actor | 21 |
| who | dbo: Person | 22 |
| born in | dbo: birthPlace | 23 |
| in | dbo: headquarter | 24 |
| in | dbo: league | 25 |
| in | dbo: location | 26 |
| in | dbo: ground | 27 |
| in | dbo: locationCity | 28 |
| Berlin | dbr: Berlin | 29 |

In this embodiment of the present application, step 104 may be understood as a feature extraction process.

Specifically, the hidden predicate is defined in this embodiment of the present application. The hidden predicate may include the following forms:

hasphrase(p) indicates that a candidate phrase p is selected.

hasResource(p, r) indicates that a resource item r is selected, and that the candidate phrase p is mapped to the resource item r.

hasRelation(p, r, rr) indicates that a parameter matching relationship rr between a resource item p and the resource item r is selected.

Understandably, p may be a phrase identifier of a candidate phrase, and that p and r may be identifiers of resource items. The parameter matching relationship rr may be one of the following: 1_1, 1_2, 2_1, and 2_2.

Specifically, in this embodiment of the present application, the parameter matching relationship rr may be one of the following: 1_1, 1_2, 2_1, and 2_2. Then, that the parameter matching relationship between the resource item p and the resource r is m1_m2 indicates that the m1$^{th}$ parameter of the resource item p is aligned with the m2$^{th}$ parameter of the resource item r, where m1 is 1 or 2, and m2 is 1 or 2.

Table 3 shows a specific example of the foregoing parameter matching relationship. The third column in Table 3 provides a question to explain a parameter matching relationship in the second column.

TABLE 3

| 1_1 | dbo: height 1_1<br>dbr: Michael Jordan | How tall is Michael Jordan? |
|---|---|---|
| 1_2 | dbo: River 1_2<br>dbo: crosses | Which river does the Brooklyn Bridge cross? |
| 2_1 | dbo: creator 2_1<br>dbr: Walt Disney | Which television shows were created by Walt Disney? |
| 2_2 | dbo: birthplace 2_2<br>dbo: capital | Which actors were born in the capital of American? |

"dbo:height 1_1 dbr:Michael Jordan" indicates that a parameter matching relationship between a resource item dbo:height and a resource item dbr:Michael Jordan is 1_1. That is, the first parameter of the resource item dbo:height is aligned with the first parameter of the resource item dbr:Michael Jordan.

It may be understood that a value 1 of a hidden predicate indicates that a corresponding candidate phrase and resource item and a parameter matching relationship between resource items are selected, and that a value 0 of the hidden predicate indicates that a corresponding candidate phrase and resource item and a parameter matching relationship between resource items are not selected. In other words, the value 1 of the hidden predicate indicates that a corresponding proposition is true, and the value 0 of the hidden predicate indicates that the corresponding proposition is false.

For example, with reference to Table 1, hasphrase(11)=1 indicates that the proposition "candidate phrase actors is selected" is true, and hasphrase(11)=0 indicates that the proposition "candidate phrase actors is selected" is false.

In this manner, for the first candidate phrases and the first resource items that are determined in steps 102 and 103, possible question parse spaces may be created based on the hidden predicates. Specifically, one point in a possible question parse space indicates one proposition set. A proposition set includes a group of propositions, and the group of propositions is represented by values of a group of hidden predicates. It may be understood that truth or falsity of a group of propositions in a proposition set are represented by values of corresponding hidden predicates.

Specifically, in this embodiment of the present application, observed predicates (observed predicates) are further defined to indicate features of the first candidate phrases, features of the first resource items, and a relationship between the first candidate phrases and the first resource items.

The features of the first candidate phrases include positions of the first candidate phrases in the question, parts of speech of head words of the first candidate phrases, tags on a dependency path between every two of the first candidate phrases, and the like.

The features of the first resource items include types of the first resource items, a correlation value between every two of the first resource items, a parameter matching relationship between every two of the first resource items, and the like.

The relationship between the first candidate phrases and the first resource items includes prior matching scores between the first candidate phrases and the first resource items.

Then, it may be understood that determining the values of the observed predicates in step 104 includes: determining the positions of the first candidate phrases in the question; determining the parts of speech of the head words of the first candidate phrases by using a Stanford part-of-speech tagging tool; determining the tags on the dependency path between every two of the first candidate phrases by using a Stanford dependency syntax parser tool; determining the types of the first resource items from the knowledge base, where the types are entity or class or relation; determining the parameter matching relationship between every two of the first resource items from the knowledge base, where the parameter matching relationship is one of the following: 1_1, 1_2, 2_1, and 2_2; using a similarity coefficient between every two of the first resource items as the correlation value between every two of the first resource items; and calculating the prior matching scores between the first candidate phrases and the first resource items, where the prior matching scores are used to indicate probabilities that the first candidate phrases are mapped to the first resource items.

Specifically, the determining the parameter matching relationship between every two of the first resource items from the knowledge base includes: determining a parameter matching relationship m1_m2 between a first resource item r1 and a first resource item r2 from the knowledge base, for indicating that the m1$^{th}$ parameter of the first resource item r1 is aligned with the m2$^{th}$ parameter of the first resource item r2. The first resource items include the first resource item r1 and the first resource item r2, where m1 is 1 or 2, and m2 is 1 or 2.

Specifically, the hidden predicate may include the following forms:

phraseIndex(p, i, j) indicates a start position i and an end position j of a candidate phrase p in a question.

phrasePosTag(p, pt) indicates a part of speech pt of a head word of the candidate phrase p.

Specifically, a Stanford part-of-speech tagging tool may be used to determine the part of speech of the head word.

phraseDepTag(p, q, dt) indicates a tag dt on a dependency path between the candidate phrase p and a candidate phrase q.

Specifically, a Stanford dependency parser tool may be used to create a dependency parse tree of a question, and feature extraction is performed according to the dependency parse tree to determine tags on the dependency path between two candidate phrases.

Figure 2:
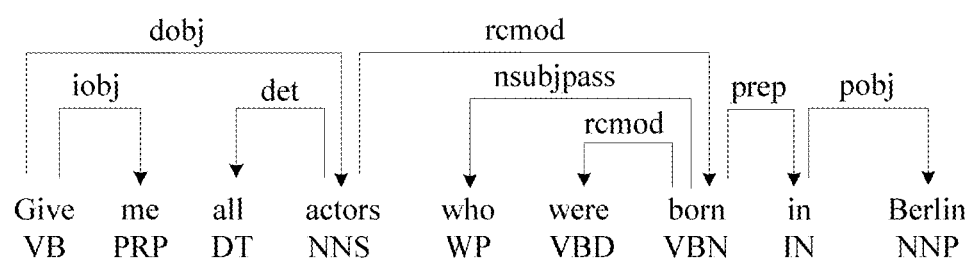
FIG. 2 is an example of a dependency parse tree according to an embodiment of the present application.

For example, a dependency parse tree of the question "Give me all actors who were born in Berlin." is shown in FIG. 2.

phraseDepOne(p, q) indicates that when there is only one tag on the dependency path between the candidate phrase p and the candidate phrase q, the predicate is true, or when there are multiple tags on the dependency path between the candidate phrase p and the candidate phrase q, the predicate is false.

It may be understood that the predicate phraseDepOne(p, q) in the observed predicates includes only a predicate whose result is true.

hasMeanWord(p, q) indicates that when words on the dependency path between the candidate phrase p and the candidate phrase q are all stop words or their parts of speech are "dt", "in", "wdt", "to", "cc", "ex", "pos", or "wp", hasMeanWord(p, q) is false, or otherwise, hasMeanWord(p, q) is true.

"dt" is a determiner, "in" is a preposition "in", "wdt" is an interrogative word beginning with "w", "to" is a preposition "to", "cc" is a connector, "ex" is an existential word "there", "pos" is a word ending with a possessive case, and "wp" is an interrogative pronoun. Interrogative words beginning with "w" include "what", "which", and the like, and the connectors include "and", "but", "or", and the like. Specifically, a symbol indicating the foregoing parts of speech may be acquired from a part-of-speech tagging set.

It may be understood that the predicate hasMeanWord(p, q) in the observed predicates includes only a predicate whose result is true.

resourceType(r,rt) indicates that a type of the resource item r is rt. rt is E or C or R. E indicates an entity, C indicates a class, and R indicates a relation.

priorMatchScore(p,r,s) indicates a prior matching score s between the candidate phrase p and the resource item r.

For example, it is assumed that the knowledge base is DBpedia.

Specifically, if the type of the resource item r is E, first, an anchor text, a redirection page, and a disambiguation page in Wikipedia are collected; the candidate phrase p matches a mention phrase of the resource item r; a corresponding frequency may be used as the prior matching score. The corresponding frequency refers to a value obtained after times that the candidate phrase p is linked to the resource item r is divided by a total times that the candidate phrase p is linked.

Specifically, if the type of the resource item r is C, the prior matching score between the candidate phrase p and the resource item r may be $\gamma \cdot s_1 + (1-\gamma) \cdot s_2 \cdot \gamma$ is any value between 0 and 1, for example, $\gamma=0.6$. $s_1$ is a Levenshtein distance between a label of the resource item r and the candidate phrase p, and $s_2$ is a measurement value of cosine similarity between a vector of the candidate phrase p and a vector of the resource item r. For the Levenshtein distance, reference may be made to "A guided tour to approximate string matching" published in ACM Comput. Surv. by Navarro in 2001. For calculation of $s_2$, reference may be made to "Recurrent neural network based language model" published in INTERSPEECH by Mikolov, etc. in 2010.

Specifically, if the type of the resource item r is R, the prior matching score between the candidate phrase p and the resource item r may be $\alpha \cdot s_1 + \beta \cdot s_2 + (1-\alpha-\beta) \cdot s_3 \cdot \alpha$ and $\beta$ are any values between 0 and 1, and $\alpha+\beta<1$, for example, $\alpha=0.3$, and $\beta=0.3$. $s_1$ is a Levenshtein distance between a label of the resource item r and the candidate phrase p, $s_2$ is a measurement value of cosine similarity between a vector of the candidate phrase p and a vector of the resource item r, and $s_3$ is a Jaccard coefficient of a matching set of the resource item r and a relation pattern. The relation pattern is the relation pattern defined by PATTY and ReVerb. For calculation of $s_3$, reference may be made to "Natural language questions for the web of data" published in EMNLP by Yahya, etc. in 2012.

hasRelatedness(p, q,s) indicates a correlation value s between the resource item p and the resource item q. A value interval of the correlation value s is 0 to 1. Specifically, the correlation value s may be a similarity coefficient between the resource item p and the resource item q. Optionally, the similarity coefficient may also be referred to as a Jaccard similarity coefficient or a Jaccard coefficient or a similarity evaluation coefficient.

For example, referring to "Natural language questions for the web of data" published in EMNLP by Yahya, etc. in 2012, the similarity coefficient between the resource item p and the resource item q may be equal to a Jaccard coefficient of an in-degree set of the resource item p and the resource item q.

isTypeCompatible(p, q,rr) indicates a parameter matching relationship rr between the resource item p and the resource item q.

Specifically, in this embodiment of the present application, the parameter matching relationship rr may be one of the following: 1_1, 1_2, 2_1, and 2_2. The parameter matching relationship is not further described herein to avoid repetition. For details, reference may be made to the foregoing description.

hasQueryResult(p, q,o,rr1,rr2) indicates a parameter matching relationship between the resource item p, the resource item q, and a resource item o. Specifically, a parameter matching relationship rr1 exists between the resource item p and the resource item q, and a parameter matching relationship rr2 exists between the resource item q and the resource item o.

It may be understood that in the observed predicates described above, phraseIndex(p,i,j), phrasePosTag(p,pt), phraseDepTag(p, q,dt), phraseDepOne(p, q), and hasMeanWord(p, q) are used to indicate features of the candidate phrases. resourceType(r,rt), hasRelatedness(p, q,s), isTypeCompatible(p, q,rr), and hasQueryResult(p, q,o,rr1,rr2) are used to indicate features of the resource items. priorMatchScore(p,r,s) is used to indicate the relationship between the candidate phrases and the resource items.

p and q may be phrase identifiers of candidate phrases, and p, q, r, and o may be identifiers of resource items.

In this manner, the values of the corresponding predicates can be determined based on the first candidate phrases and the first resource items that are determined in steps 102 and 103.

For example, for the question "Give me all actors who were born in Berlin", on a basis of Table 1 and Table 2, the values of the observed predicates may be calculated in step 104. Specifically, expressions in which values of observed predicates are 1 include:

phraseIndex(11, 3, 3)
phraseIndex(12, 4, 4)
phraseIndex(13, 6, 7)
phraseIndex(14, 7, 7)
phraseIndex(15, 8, 8)
phrasePosTag(11,nn)
phrasePosTag(12,wp)
phrasePosTag(13,vb)
phrasePosTag(14,in)
phrasePosTag(15,nn)
phraseDepTag(11, 13,rcmod)
phraseDepTag(12, 13,nsubjpass)
phraseDepTag(12, 14,nsubjpass)
phraseDepTag(13, 15,pobj)
phraseDepTag(14, 15,pobj)
phraseDepOne(11, 13)
phraseDepOne(12, 13)
phraseDepOne(12, 14)
phraseDepOne(13, 15)
phraseDepOne(14, 15)
hasMeanWord(12, 14)
resourceType(21,E)
resourceType(22,E)
resourceType(23,R)
resourceType(24,R)

resourceType(25,R)
resourceType(26,R)
resourceType(27,R)
resourceType(28,R)
resourceType(29,E)
priorMatchScore(11, 21, 1.000000)
priorMatchScore(12, 22, 1.000000)
priorMatchScore(13, 23, 1.000000)
priorMatchScore(14, 24, 1.000000)
priorMatchScore(14, 25, 1.000000)
priorMatchScore(14, 26, 1.000000)
priorMatchScore(14, 27, 1.000000)
priorMatchScore(14, 28, 1.000000)
priorMatchScore(15, 29, 1.000000)
hasRelatedness(21, 23, 1.000000)
hasRelatedness(22, 23, 1.000000)
hasRelatedness(22, 24, 0.440524)
hasRelatedness(22, 25, 0.425840)
hasRelatedness(22, 26, 0.226393)
hasRelatedness(22, 27, 0.263207)
hasRelatedness(23, 29, 0.854583)
hasRelatedness(24, 29, 0.816012)
hasRelatedness(26, 29, 0.532818)
hasRelatedness(27, 29, 0.569732)
hasRelatedness(28, 29, 0.713400)
isTypeCompatible(21, 23, 1_1)
isTypeCompatible(22, 23, 1_1)
isTypeCompatible(22, 23, 1_2)
isTypeCompatible(22, 24, 1_2)
isTypeCompatible(22, 25, 1_1)
isTypeCompatible(22, 26, 1_1)
isTypeCompatible(22, 26, 1_2)
isTypeCompatible(22, 27, 1_2)
isTypeCompatible(23, 29, 2_1)
isTypeCompatible(24, 29, 2_1)
isTypeCompatible(26, 29, 2_1)
isTypeCompatible(27, 29, 2_1)
isTypeCompatible(28, 29, 2_1)
hasQueryResult(21, 23, 29, 1_1, 2_1)
hasQueryResult(22, 23, 29, 1_1, 2_1)
hasQueryResult(22, 26, 29, 1_1, 2_1)

It may be understood that a value 1 of an observed predicate indicates that a corresponding proposition is true.

For example, a value of phraseIndex(11, 3, 3) is 1, which indicates that the proposition "a start position i and an end position j of a first candidate phrase actors in the question are both 3" is true. 11 is a phrase identifier of the candidate phrase "actors", as shown in Table 1.

A value of phrasePosTag(13, vb) is 1, which indicates that the proposition "a head word of the first candidate phrase born in is born, and a part of speed thereof is vb" is true. 13 is a phrase identifier of the candidate phrase "born in", as shown in Table 1.

A value of phraseDepTag(13, 15, pobj) is 1, which indicates that the proposition "a tag on a dependency path between the first candidate phrase born in and the first candidate phrase Berlin is pobj" is true. 13 is a phrase identifier of the candidate phrase "born in", and 15 is a phrase identifier of the candidate phrase "Berlin", as shown in Table 1.

For meanings of other expressions in which values of observed predicates are 1, reference may be made to the foregoing explanation. To avoid repetition, details are not described herein again.

It may be understood that expressions in which values of observed predicates are 0 may also be included. For brevity, such expressions are not further listed herein.

Optionally, in this embodiment of the present application, a predicate resource may also be used to indicate an identifier of a resource item.

For example, it can be learned from Table 2, values of the following predicates are 1:
resource(21,dbo:Actor)
resource(22,dbo:Person)
resource(23,dbo:birthPlace)
resource(24,dbo:headquarter)
resource(25,dbo:league)
resource(26,dbo:location)
resource(27,dbo:ground)
resource(28,dbo:locationCity)
resource(29,dbr:Berlin)

It may be understood that in this embodiment of the present application, the first candidate phrases and the first resource items that are determined in steps 102 and 103 are ambiguous. In this embodiment of the present application, the ambiguities of the first candidate phrases and the first resource items are eliminated through uncertain inference.

The uncertain inference is to perform inference and make a decision according to uncertainty information. An uncertain inference network may process an incomplete data set with noise, use a probability measurement weight to describe a correlation between data, and aim at solving inconsistency and uncertainty of data.

In this embodiment of the present application, a model used for the uncertain inference in step 105 may be any one of the following: a Bayesian Network, a Probabilistic relational model, a Bayesian logic program model (Bayesian logic programs), a relational Markov network, a Markov logic network, and probabilistic soft logic. The present application is not limited thereto.

Optionally, in this embodiment of the present application, the uncertain inference in step 105 is based on the Markov logic network (MLN), where the MLN includes a predefined first-order formula and a weight of the first-order formula. That is, a model used for the uncertain inference is the MLN.

Optionally, in this embodiment of the present application, the first-order formula may include a Boolean formula and a weighted formula. A weight of the Boolean formula is +∞. The Boolean formula may be understood as a first-order logic formula in first-order logic, indicating a hard rule (hard constraints), and may also be referred to as a hard formula (hard formulas, hf), and is a constraint that all ground atoms must satisfy. A weight of the weighted formula is a weighted formula weight. The weighted formula is a soft rule (soft constraints), and may also be referred to as a soft formula (soft formulas, sf). A penalty may be applied if a ground atom violates the rule.

The first-order formula is formed by a first-order predicate, a logical connector, and a variable. The first-order predicate may include the foregoing observed predicate and hidden predicate.

It should be noted that in this embodiment of the present application, the MLN may also include a second-order formula, a first-order formula, a weight of the second-order formula, and a weight of the first-order formula. Alternatively, the MLN may also include a higher-order formula and a weight, which is not limited in the present application.

Specifically, Boolean formulas are shown in Table 4, where a symbol "_" indicates any constant in a logical variable, and |•| indicates a quantity of true ground atoms in the formula.

TABLE 4

| | |
|---|---|
| hf1 | hasPhrase(p) ⇒ hasResource(p,_) |
| hf2 | hasResource(p,_) ⇒ hasPhrase(p) |
| hf3 | \|hasResource(p,_)\|≤1 |
| hf4 | !hasPhrase(p) ⇒ !hasResource(p,r) |
| hf5 | hasResource(_,r) ⇒ hasRelation(r,_,_) ∨ hasRelation(_,r,_) |
| hf6 | \|hasRelation(r1,r2,_)\|≤1 |
| hf7 | hasRelation(r1,r2,_) ⇒ hasResource(_,r1) ∧ hasResource(_,r2) |
| hf8 | phraseIndex(p1,s1,e1) ∧ phraseIndex(p2,s2,e2) ∧ overlap(s1,e1,s2,e2) ∧ hasPhrase(p1) ⇒ !hasPhrase(p2) |
| hf9 | resourceType(r,E) ⇒ !hasRelation(r,_,2_1) ∧ !hasRelation(r,_,2_2) |
| hf10 | resourceType(r,E) ⇒ hasRelation(_,r,2_1) ∧ !hasRelation(r,_,2_2) |
| hf11 | resourceType(r,C) ⇒ !hasRelation(r,_,2_1) ∧ !hasRelation(r,_,2_2) |
| hf12 | resourceType(r,C) ⇒ !hasRelation(_,r,2_1) ∧ !hasRelation(r,_,2_2) |
| hf13 | !isTypeCompatible(r1,r2,rr) ⇒ !hasRelation(r1,r2,rr) |

Specifically, meanings in Table 4 are as follows:

hf1: indicates that if a phrase p is selected, the phrase p is mapped to at least one resource item.

hf2: indicates that if a mapping of a phrase p to a resource item is selected, the phrase p must be selected.

hf3: indicates that a phrase p can be mapped to only one resource item.

hf4: indicates that if a phrase p is not selected, any mapping relationship of the phrase p to a resource item is not selected.

hf5: indicates that if a mapping of a phrase to a resource item r is selected, the resource item i is related to at least another one resource item.

hf6: indicates that there is only one parameter matching relationship between two resource items r1 and r2.

hf7: indicates that if two resource items r1 and r2 have a parameter matching relationship, at least one mapping of a phrase to the resource item r1 is selected and at least one mapping of a phrase to the resource item 2 is selected.

hf8: indicates that any two selected phrases do not overlap. Herein, the overlap may be used for representing positions in a question.

hf9, hf10, hf11, and hf12: indicate that if a type of a resource item r is entity or class, the resource item r cannot have a second parameter that is aligned with other resource items.

hf13: indicates that two resource items r1 and r2 are consistent in the parameter matching relationship.

It may be understood that in Table 4, a logical connector "∧" indicates "and", a logical connector "∨" indicates "or", and a logical connector "!" indicates "not".

Specifically, weighted formulas are shown in Table 5, where a symbol "+" indicates that a weight must be set for each constant of a logical variable.

TABLE 5

| | |
|---|---|
| sf1 | priorMatchScore(p,r,s) ⇒ hasPhrase(p) |
| sf2 | priorMatchScore(p,r,s) ⇒ hasResource(p,r) |
| sf3 | phrasePosTag(p,pt+) ∧ resourceType(r,rt+) ⇒ hasResource(p,r) |
| sf4 | phraseDepTag(p1,p2,dp+) ∧ hasResource(p1,r1) ∧ hasResource(p2,r2) ⇒ hasRelation(r1,r2,rr+) |
| sf5 | phraseDepTag(p1,p2,dp+) ∧ hasResource(p1,r1) ∧ hasResource(p2,r2) ∧ !hasMeanWord(p1,p2) ⇒ hasRelation(r1,r2,rr+) |

TABLE 5-continued

| | |
|---|---|
| sf6 | phraseDepTag(p1,p2,dp+) ∧ hasResource(p1,r1) ∧ hasResource(p2,r2) ∧ phraseDepOne(p1,p2) ⇒ hasRelation(r1,r2,rr+) |
| sf7 | hasRelatedness(r1,r2,s) ∧ hasResource(_,r1) ∧ hasResource(_,r2) ⇒ hasRelation(r1,r2,_) |
| sf8 | hasQueryResult(r1,r2,r3,rr1,rr2) ⇒ hasRelation(r1,r2,rr1) ∧ hasRelation(r2,r3,rr2_) |

Specifically, meanings in Table 5 are as follows:

sf1 and sf2: indicate that if a prior matching score s of a phrase p mapped to a resource item r is greater, a probability that the phrase r and resource item r are selected is higher.

sf3: indicates that a part of speech of a head word of the phrase p and a type of the resource item r to which the phrase p is mapped have a relationship.

sf4, sf5, and sf6: indicate that a tag on a dependency path between two phrases p1 and p2 and a parameter matching relationship between two resource items r1 and r2 have a relationship, where the phrase p1 is mapped to the resource item r1 and the phrase p2 is mapped to the resource item r2.

sf7: indicates that if a correlation value between two resource items r1 and r2 is greater, a probability that the two resource items r1 and r2 have a parameter matching relationship is higher.

sf8: indicates that if a resource item triple has a query result, the three resource items should have a corresponding parameter matching relationship.

It should be noted that in this embodiment of the present application, the weighted formula weight may be set manually. For example, the weight may be an empirical value preset by an administrator or an expert of a knowledge base.

In this embodiment of the present application, the weighted formula weight may also be obtained through training by using a learning method.

It may be understood that weighted formula weights are generally different for different knowledge bases. In this embodiment of the present application, the Boolean formulas shown in Table 4 may be understood as general rules that all knowledge bases satisfy. The weighted formulas shown in Table 5 may be understood as particular rules for which weighted formula weights are different for different knowledge bases.

In this embodiment of the present application, the Boolean formula and the weighted formula may be collectively referred to as "meta rule". That is, the "meta rule" is a rule that is applicable to knowledge bases in different fields.

In this embodiment of the present application, step 105 may also be referred to as inference or joint inference or joint disambiguation. Specifically, a thebeast tool may be used to perform joint inference. Optionally, for each proposition set in the question parse spaces, confidence of each proposition set may be calculated according to the values of the observed predicates and the values of the hidden predicates by using a cutting plane method (cutting plane method or cutting plane approach). Specifically, for the thebeast tool, reference may be made to https://code.google.com/p/thebeast/.

In addition, confidence of each proposition set may be calculated by means of maximum-likelihood estimation of an undirected graph model.

Optionally, the MLN is indicated by M, the first-order formula is indicated by $\phi_i$, the weight of the first-order formula is indicated by $w_i$, and the proposition set is indicated by y; then, step 105 may be:

calculating the confidence of each proposition set according to $$p(y) = \frac{1}{Z}\exp\left(\sum_{(\phi_i, w_i) \in M} w_i \sum_{c \in C^{n\phi_i}} f_c^{\phi_i}(y)\right),$$

where

Z is a normalization constant, $C^{n\phi_i}$ is a sub-formula set corresponding to the first-order formula $\phi_i$, c is a sub-formula in the sub-formula set $C^{n\phi_i}$, $f_c^{\phi_i}$ is a binary feature function, and $f_c^{\phi_i}(y)$ indicates truth or falsity of the first-order formula in the proposition set y.

A value of the binary feature function $f_c^{\phi_i}$ is 1 or 0. Specifically, in the proposition set y, when the sub-formula c is true, $f_c^{\phi_i}$ is 1, or otherwise, $f_c^{\phi_i}$ is 0.

Optionally, a maximum count of cycle times may be set in step 105. For example, the maximum count of cycle times is 100.

In this manner, after the confidence of each proposition set is calculated in step 105, a confidence set corresponding to a possible question parse space may be obtained, and each confidence in the confidence set is corresponding to a proposition set.

Further, in step 106, one or several proposition sets may be selected from multiple proposition sets of the possible question parse spaces, and confidence of the selected one or several proposition sets satisfies a preset condition.

Optionally, in step 106, a proposition set whose confidence value is largest may be determined, and a combination of true propositions in the proposition set whose confidence value is largest is acquired.

Optionally, in step 106, multiple proposition sets whose confidence values are largest may be determined, and a combination of true propositions in the multiple proposition sets whose confidence values are largest is acquired. The present application is not limited thereto.

Because truth or falsity of propositions in the proposition sets are represented by values of hidden predicates, it may be understood that the acquiring a combination of true propositions in step 106 is acquiring a combination of hidden predicates whose values are 1. In addition, the true propositions are used to indicate search phrases selected from the first candidate phrases, search resource items selected from the first resource items, and features of the search resource items.

For example, for the question "Give me all actors who were born in Berlin.", expressions in which determined values of hidden predicates are 1 are as follows:
 hasphrase(11)
 hasphrase(13)
 hasphrase(15)
 hasResource(11, 21)
 hasResource(13, 23)
 hasResource(15, 29)
 hasRelation(21, 23, 11)
 hasRelation(23, 29, 21)

Further, a formal query statement may be generated in step 107. Optionally, the formal query statement may be an SQL. Alternatively, in this embodiment of the present application, the formal query statement may be a SPARQL; correspondingly, step 107 may also be referred to as a SPARQL generation process.

Optionally, step 107 may be: generating the SPARQL according to the combination of true propositions by using a SPARQL template.

Specifically, a triple of the SPARQL may be created by using the combination of true propositions, and further, the SPARQL is generated by using the SPARQL template.

Specifically, natural language questions may be classified into three types: Yes/No, Number, and Normal. Correspondingly, the SPARQL template also includes an ASK WHERE template, a SELECT COUNT(?url) WHERE template, and a SELECT ?url WHERE template.

Then, when the question is a Yes/No question, the SPARQL is generated according to the combination of true propositions by using the ASK WHERE template.

When the question is a Normal question, the SPARQL is generated according to the combination of true propositions by using the SELECT ?url WHERE template.

When the question is a Numeric question, the SPARQL is generated according to the combination of true propositions by using the SELECT ?url WHERE template, or when a numeric answer cannot be obtained for the SPARQL generated by using the SELECT ?url WHERE template, the SPARQL is generated by using the SELECT COUNT(?url) WHERE template.

For example, the question "Give me all actors who were born in Berlin." is a Normal question, and the generated SPARQL is:
 SELECT ?url WHERE{
 ?x rdf:type dbo:Actor.
 ?x dbo:birthplace dbr:Berlin.
 }

Optionally, step 107 may include: generating a resource query graph according to the combination of true propositions, where the resource query graph includes vertexes and edges, where the vertexes include the search phrases and the search resource items, and a search phrase in each vertex is mapped to a search resource item in the vertex. The edge indicates a parameter matching relationship between two search resource items in two connected vertexes, and further the SPARQL is generated according to the resource query graph.

Specifically, three interconnected search resource items in the resource query graph may be used as the triple of the SPARQL, where a type of a middle search resource item in the three interconnected search resource items is relation.

In this manner, in this embodiment of the present application, the natural language question may be converted into the SPARQL. In addition, the used predefined first-order formula is field-independent, that is, the predefined Boolean formula and weighted formula may be applied to all knowledge bases and have extensibility. That is, by using the method provided in this embodiment of the present application, it is unnecessary to manually set a conversion rule.

Figure 3:
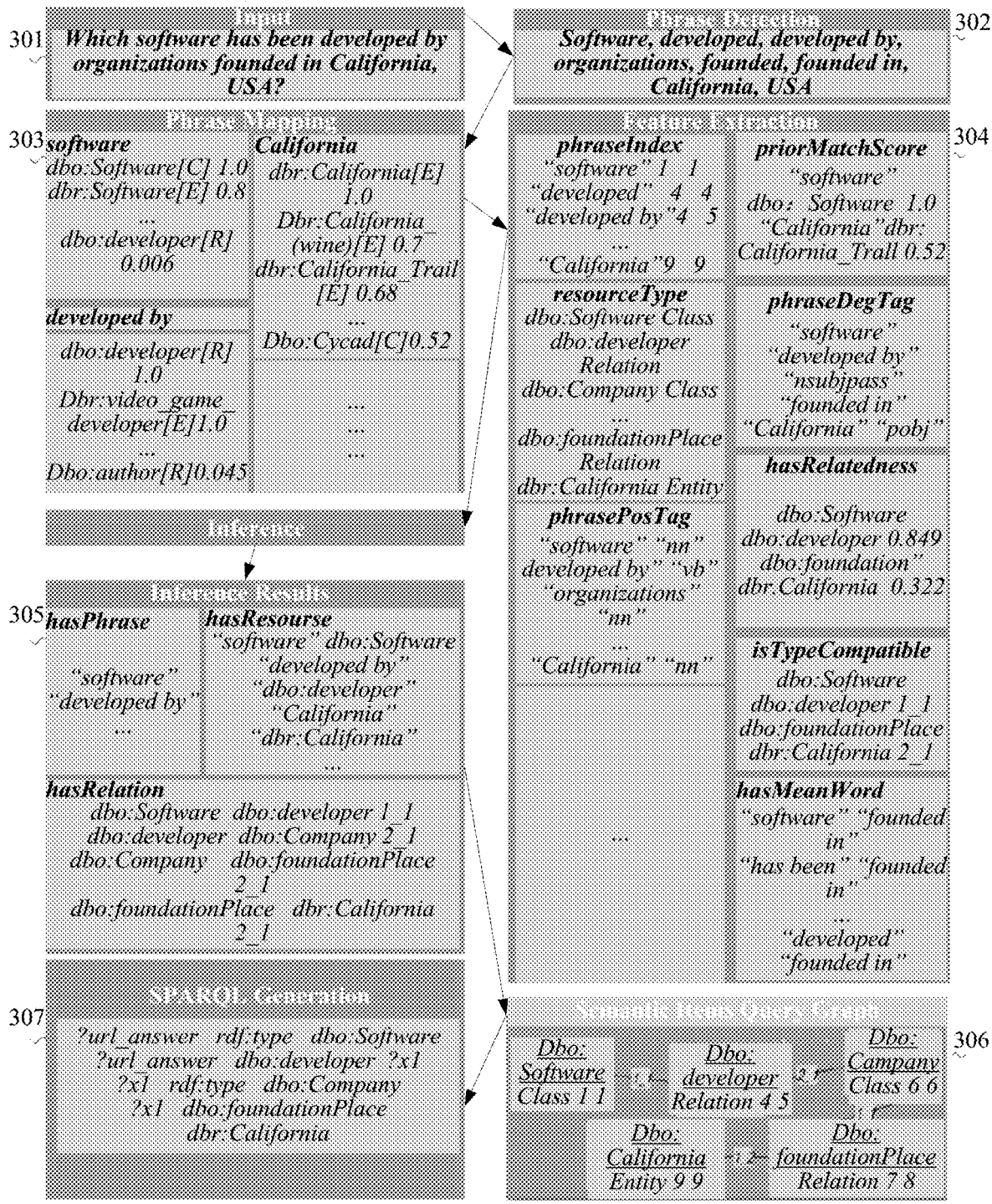
FIG. 3 is a schematic diagram of a method for parsing a question in a knowledge base according to another embodiment of the present application.

For example, FIG. 3 shows an example of question parsing according to the present application.

301. Receive a question entered by a user. It is assumed that the question is a natural language question "Which software has been developed by organization founded in California, USA?"

302. Perform phrase detection on the question entered in step 301 to determine first candidate phrases.

For a detailed description of step 302, reference may be made to step 102 in the foregoing embodiment, and to avoid repetition, details are not described herein again.

For example, the determined first candidate phrases include: software, developed, developed by, organizations, founded in, founded, California, and USA.

303. Perform phrase mapping on the first candidate phrases determined in step 302, and map the first candidate phrases to first resource items.

For a detailed description of step 303, reference may be made to step 103 in the foregoing embodiment, and to avoid repetition, details are not described herein again.

For example, the first candidate phrase "software" is mapped to dbo: Software, dbr: Software, and the like, which are not further listed herein.

304. Determine values of observed predicates and create possible question parse spaces, through feature extraction.

For a detailed description of step 304, reference may be made to step 104 in the foregoing embodiment, and to avoid repetition, details are not described herein again.

It should be noted that details are not further listed herein.

305. Calculate confidence of each proposition set through joint inference, and acquire a combination of true propositions in a proposition set whose confidence satisfies a preset condition.

For a detailed description of step 305, reference may be made to steps 105 and 106 in the foregoing embodiment, and to avoid repetition, details are not described herein again.

The combination of true propositions is a combination of hidden predicates whose values are 1.

For example, expressions in which determined values of hidden predicates are 1 are:
hasPhrase(software),
hasPhrase(developed by),
hasPhrase(organizations),
hasPhrase(founded in),
hasPhrase(California);
hasResource(software, dbo:Software),
hasResource(developed by, dbo:developer),
hasResource(California, dbr:California),
hasResource(organizations, dbo:Company),
hasResource(founded in, dbo:foundationPlace);
hasRelation(dbo:Software, dbo:developer, 1_1),
hasRelation(dbo:developer, dbo:Company, 2_1),
hasRelation(dbo:Company, dbo:foundationPlace, 1_1),
hasRelation(dbo:foundationPlace, dbr: California, 2_1).

306. Generate a resource items query graph.

Specifically, the resource items query graph may also be referred to as a semantic items query graph.

Specifically, a vertex in the resource items query graph may include a search resource item, a type of the search resource item, and a position of a search phrase that is in the question and is mapped to the search resource item.

Specifically, an edge in the resource items query graph includes a parameter matching relationship between two search resource items in two vertexes connected by the edge.

It should be noted that a relation between search resource items in the resource items query graph is a binary relation.

Figure 4:
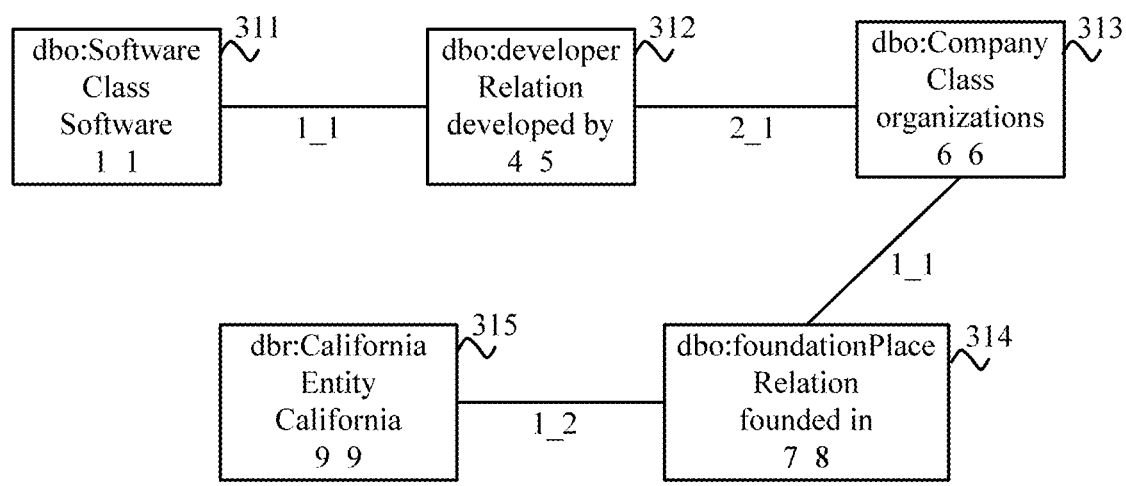
FIG. 4 is a resource items query graph according to an embodiment of the present application.

Optionally, a vertex in the resource items query graph may include a search phrase, a search resource item, a type of the search resource item, a search phrase mapped to the search resource item, and a position of the search phrase in the question. FIG. 4 is a resource items query graph, including vertexes 311 to 315.

The vertex 311 includes a search resource item dbo: Software, a type Class of the search resource item, and a search phrase "Software" and a position 1 1 of the search phrase in the question. The search phrase "Software" is mapped to the search resource item dbo: Software.

The vertex 312 includes a search resource item dbo: developer, a type Relation of the search resource item, and a search phrase "developed by" and a position 4 5 of the search phrase in the question. The search phrase "Software" is mapped to the search resource item dbo: Software.

The vertex 313 includes a search resource item dbo: Company, a type Class of the search resource item, and a search phrase "organizations" and a position 6 6 of the search phrase in the question. The search phrase "organizations" is mapped to the search resource item dbo:Company.

The vertex 314 includes a search resource item dbo: foundationPlace, a type Relation of the search resource item, and a search phrase "founded in" and a position 7 8 of the search phrase in the question. The search phrase "founded in" is mapped to the search resource item dbo:foundationPlace.

The vertex 315 includes a search resource item dbr: California, a type Entity of the search resource item, and a search phrase "California" and a position 9 9 of the search phrase in the question. The search phrase "California" is mapped to the search resource item dbr:California.

An edge 1_1 between the vertex 311 and the vertex 312 indicates that a parameter matching relationship between the search resource item dbo: Software and the search resource item dbo:developer is 1_1.

An edge 2_1 between the vertex 312 and the vertex 313 indicates that a parameter matching relationship between the search resource item dbo: developer and the search resource item dbo:Company is 2_1.

An edge 1_1 between the vertex 313 and the vertex 314 indicates that a parameter matching relationship between the search resource item dbo:Company and the search resource item dbo:foundationPlace is 1_1.

An edge 1_2 between the vertex 315 and the vertex 314 indicates that a parameter matching relationship between the search resource item dbr:California and the search resource item dbo:foundationPlace is 1_2.

307. Generate a SPARQL (SPARQL generation).

Specifically, a binary relation in the resource items query graph is converted into a ternary relation.

That is, three interconnected search resource items in the resource items query graph have a ternary relation, and a type of a middle search resource item in the three interconnected search resource items is relation.

For example, the natural language question in step 301 is a Normal question, and a SPARQL generated by using the SELECT ?url WHERE template is:
SELECT ?url WHERE{
?url_answer rdf:type dbo: Software
?url_answer dbo:developer ?x1
?x1 rdf:type dbo:Company
?x1 dbo:foundationPlace dbr:California
}

In this manner, in this embodiment of the present application, the natural language question may be converted into the SPARQL. In addition, the used predefined first-order formula is field-independent, that is, the predefined Boolean formula and weighted formula may be applied to all knowledge bases and have extensibility. That is, by using the method provided in this embodiment of the present application, it is unnecessary to manually set a conversion rule.

In addition, it may be understood that in this embodiment of the present application, the predefined Boolean formula and weighted formula are language-independent, that is, have language extensibility. For example, the formulas may be used both in English language knowledge bases and Chinese language knowledge bases.

As described above, in this embodiment of the present application, the uncertain inference in step 105 may be based on the MLN. The MLN includes the predefined first-order formula and the weight of the first-order formula.

Figure 5:
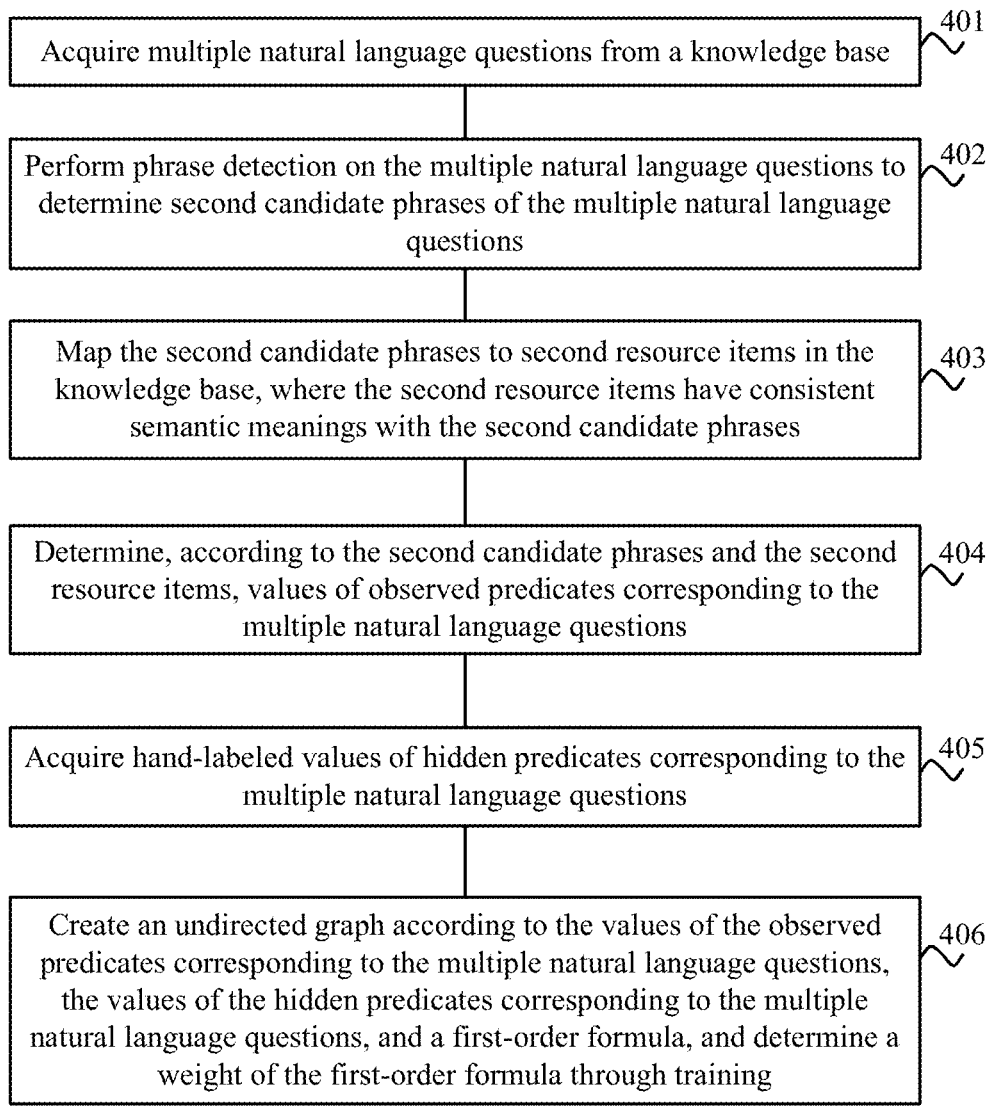
FIG. 5 is a flowchart of a method for determining a weight of a weighted formula according to an embodiment of the present application.

Optionally, the first-order formula may include a Boolean formula and a weighted formula. A weight of the Boolean formula is +∞, and a weight of the weighted formula is a weighted formula weight. The weighted formula weight may be obtained through training by using a learning method. Then, it may be understood that before step 101, as shown in FIG. 5, the method may further include:

401. Acquire multiple natural language questions from the knowledge base.

402. Perform phrase detection on the multiple natural language questions to determine second candidate phrases of the multiple natural language questions.

403. Map the second candidate phrases to second resource items in the knowledge base, where the second resource items have consistent semantic meanings with the second candidate phrases.

404. Determine, according to the second candidate phrases and the second resource items, values of observed predicates corresponding to the multiple natural language questions.

405. Acquire hand-labeled values of hidden predicates corresponding to the multiple natural language questions.

406. Create an undirected graph according to the values of the observed predicates corresponding to the multiple natural language questions, the values of the hidden predicates corresponding to the multiple natural language questions, and the first-order formula, and determine the weight of the first-order formula through training.

In this manner, in this embodiment of the present application, based on the predefined first-order formula, by using the learning method, the weight of the first-order formula for the knowledge base can be determined, and the first-order formula may be used as a conversion rule for the knowledge base. In this manner, it is unnecessary to manually set a conversion rule, and the predefined first-order formula of the Markov logic network (MLN) has extensibility, and is applicable to any knowledge base.

Specifically, a knowledge base of a question answering system includes a question base, where the question base includes multiple natural language questions. Then, step 401 may be acquiring multiple natural language questions from the question base of the knowledge base of the question answering system. In this embodiment of the present application, a quantity of natural language questions is not limited. For example, multiple natural language questions may be 1000 natural language questions.

For example, 110 natural language questions may be acquired from a training set of a question base Q1 in a question answering over linked data (QALD) system.

In this embodiment of the present application, for the process of step 402, reference may be made to the process of step 102 in the foregoing embodiment; for the process of step 403, reference may be made to the process of step 103 in the foregoing embodiment; and for the process of step 404, reference may be made to the process of step 104 in the foregoing embodiment. To avoid repetition, details are not described herein again. In this manner, for multiple natural language questions in step 401, values of observed predicates corresponding to the multiple natural language questions can be determined.

It may be understood that, before step 405, it is necessary to manually label values of hidden predicates corresponding to each natural language question in the multiple natural language questions, that is, the values that are of the hidden predicates corresponding to the multiple natural language questions and are acquired in step 405 are hand-labeled.

Optionally, the first-order formula includes a Boolean formula and a weighted formula. A weight of the Boolean formula is +∞, and a weight of the weighted formula is a weighted formula weight. The hand-labeled values of the hidden predicates in step 405 satisfy the Boolean formula. Correspondingly, in step 406, the weight of the first-order formula is determined through training, that is, the weight of the weighted formula is determined through training. The undirected graph may include a Markov network (MN).

Optionally, in step 406, the weight of the first-order formula may be determined according to the values of the observed predicates corresponding to the multiple natural language questions, the values of the hidden predicates corresponding to the multiple natural language questions, and the first-order formula by using a margin infused relaxed algorithm (MIRA).

Specifically, in step 406, a thebeast tool may be used to learn the weighted formula weight. In a parameter learning process, the weighted formula weight may be first initialized to 0, and then the MIRA is used to update the weighted formula weight. Optionally, in a training process, a maximum count of cycle times of training may be further set, for example, the maximum count of cycle times of training is 10.

For example, the weighted formula weight of sf3 in Table 5 is shown in Table 6. It may be learned from Table 6 that when a part of speech of a head word of a candidate phrase is nn, a probability that the candidate phrase is mapped to a resource item of a type E is relatively high.

TABLE 6

| Part of speech of a head word of a candidate phrase | Type of a resource item to which the candidate phrase is mapped | Weighted formula weight |
| --- | --- | --- |
| nn | E | 2.11 |
| nn | C | 0.243 |
| nn | R | 0.335 |
| vb | R | 0.517 |
| wp | C | 0.143 |
| wr | C | 0.025 |

In this manner, through this embodiment shown in FIG. 5, a weighted formula weight of any knowledge base may be determined, and therefore, a conversion rule for any knowledge base may be obtained.

It may be understood that in this embodiment of the present application, a method for determining a weight of a first-order formula is a data drive manner, and may be applied to different knowledge bases. In a case of a great reduction of labor, efficiency of parsing questions in a knowledge base may be improved.

It may be understood that in this embodiment of the present application, structure learning may also be performed according to the created undirected graph, and further a second-order formula or even a higher-order formula may be learned; further, a new undirected graph is created according to the learned second-order formula or even the higher-order formula, and a weight of the second-order formula or even the higher-order formula is learned. The present application is not limited thereto.

Figure 6:
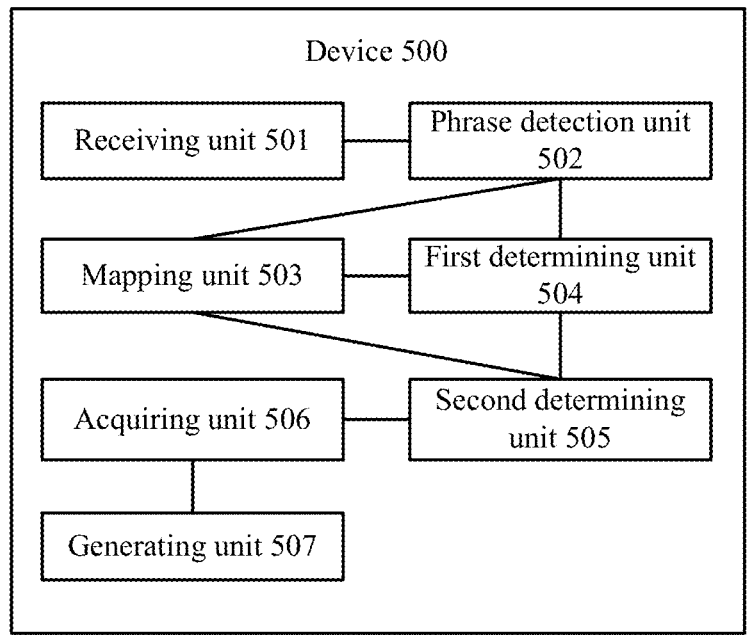
FIG. 6 is a block diagram of a device for parsing a question according to an embodiment of the present application.

FIG. 6 is a block diagram of a device for parsing a question according to an embodiment of the present application. A device 500 shown in FIG. 6 includes a receiving unit 501, a phrase detection unit 502, a mapping unit 503, a first determining unit 504, a second determining unit 505, an acquiring unit 506, and a generating unit 507.

The receiving unit 501 is configured to receive a question entered by a user.

The phrase detection unit 502 is configured to perform phrase detection on the question received by the receiving unit 501 to determine first candidate phrases.

The mapping unit 503 is configured to map the first candidate phrases determined by the phrase detection unit 502 to first resource items in a knowledge base, where the first resource items have consistent semantic meanings with the first candidate phrases.

The first determining unit 504 is configured to determine values of observed predicates and possible question parse spaces according to the first candidate phrases and the first resource items, where the observed predicates are used to indicate features of the first candidate phrases, features of the first resource items, and a relationship between the first candidate phrases and the first resource items, points in the possible question parse spaces are proposition sets, and truth or falsity of propositions in the proposition sets are represented by values of hidden predicates.

The second determining unit 505 is configured to: perform uncertain inference on each proposition set in the possible question parse spaces according to the values that are of the observed predicates and are determined by the first determining unit 504 and the values of the hidden predicates, and calculate confidence of each proposition set.

The acquiring unit 506 is configured to acquire a combination of true propositions in a proposition set whose confidence satisfies a preset condition, where the true propositions are used to indicate search phrases selected from the first candidate phrases, search resource items selected from the first resource items, and features of the search resource items.

The generating unit 507 is configured to generate a formal query statement according to the combination of true propositions that is acquired by the acquiring unit 506.

In this embodiment of the present application, uncertain inference is performed by using observed predicates and hidden predicates, and a natural language question can be converted into a formal query statement. In addition, in this embodiment of the present application, an uncertain inference method can be applied to a knowledge base in any field, and has field extensibility. Therefore, it is unnecessary to manually configure a conversion rule for a knowledge base.

Optionally, in an embodiment, the uncertain inference is based on a Markov logic network (MLN), where the MLN includes a predefined first-order formula and a weight of the first-order formula.

Optionally, in another embodiment, the acquiring unit 506 is further configured to acquire multiple natural language questions from the knowledge base;

the phrase detection unit 502 is further configured to perform phrase detection on the question received by the acquiring unit 506 to determine the first candidate phrases;

the mapping unit 503 is further configured to map the second candidate phrases to second resource items in the knowledge base, where the second resource items have consistent semantic meanings with the second candidate phrases;

the first determining unit 504 is further configured to determine, according to the second candidate phrases and the second resource items, values of observed predicates corresponding to the multiple natural language questions;

the acquiring unit 506 is further configured to acquire hand-labeled values of hidden predicates corresponding to the multiple natural language questions; and the second determining unit 505 is further configured to: create an undirected graph according to the values of the observed predicates corresponding to the multiple natural language questions, the values of the hidden predicates corresponding to the multiple natural language questions, and the first-order formula, and determine the weight of the first-order formula through training.

Optionally, in another embodiment, the first-order formula includes a Boolean formula and a weighted formula, a weight of the Boolean formula is $+\infty$, a weight of the weighted formula is a weighted formula weight, and the hand-labeled values of the hidden predicates corresponding to the multiple natural language questions satisfy the Boolean formula; and the second determining unit 505 is specifically configured to: create the undirected graph according to the values of the observed predicates corresponding to the multiple natural language questions, the values of the hidden predicates corresponding to the multiple natural language questions, and the first-order formula, and determine the weight of the weighted formula through training Optionally, in another embodiment, the second determining unit 505 is specifically configured to: create the undirected graph according to the values of the observed predicates corresponding to the multiple natural language questions, the values of the hidden predicates corresponding to the multiple natural language questions, and the first-order formula, and determine the weight of the first-order formula by using a margin infused relaxed algorithm (MIRA).

Optionally, in another embodiment, the MLN is indicated by M, the first-order formula is indicated by $\Phi_i$, the weight of the first-order formula is indicated by $w_i$, and the proposition set is indicated by y; and the second determining unit 505 is specifically configured to:

calculate the confidence of each proposition set according to $$p(y) = \frac{1}{Z} \exp\left( \sum_{(\Phi_i, w_i) \in M} w_i \sum_{c \in C^{n\Phi_i}} f_c^{\Phi_i}(y) \right),$$

where, Z is a normalization constant, $C^{n\Phi_i}$ is a sub-formula set corresponding to the first-order formula $\phi_i$, c is a sub-formula in the sub-formula set $C^{n\Phi_i}$, $f_c^{\Phi_i}$ is a binary feature function, and $f_c^{\Phi_i}(y)$ indicates truth or falsity of the first-order formula in the proposition set y.

Optionally, in another embodiment, the acquiring unit 506 is specifically configured to: determine a proposition set whose confidence value is largest, and acquire a combination of true propositions in the proposition set whose confidence value is largest.

Optionally, in another embodiment, the features of the first candidate phrases include positions of the first candidate phrases in the question, parts of speech of head words of the first candidate phrases, and tags on a dependency path between every two of the first candidate phrases;

the features of the first resource items include types of the first resource items, a correlation value between every two of the first resource items, and a parameter matching relationship between every two of the first resource items;

the relationship between the first candidate phrases and the first resource items includes prior matching scores between the first candidate phrases and the first resource items; and the first determining unit 504 is specifically configured to:

determine the positions of the first candidate phrases in the question;

determine the parts of speech of the head words of the first candidate phrases by using a Stanford part-of-speech tagging tool;

determine the tags on the dependency path between every two of the first candidate phrases by using a Stanford dependency syntax parser tool;

determine the types of the first resource items from the knowledge base, where the types are entity or class or relation;

determine the parameter matching relationship between every two of the first resource items from the knowledge base;

use a similarity coefficient between every two of the first resource items as the correlation value between every two of the first resource items; and calculate the prior matching scores between the first candidate phrases and the first resource items, where the prior matching scores are used to indicate probabilities that the first candidate phrases are mapped to the first resource items.

Optionally, in another embodiment, the formal query statement is a Simple Protocol and Resource Description Framework Query Language (SPARQL).

Optionally, in another embodiment, the generating unit 507 is specifically configured to:

generate the SPARQL according to the combination of true propositions by using a SPARQL template.

Optionally, in another embodiment, the SPARQL template includes an ASK WHERE template, a SELECT COUNT(?url) WHERE template, and a SELECT ?url WHERE template; and the generating unit 507 is specifically configured to:

when the question is a Yes/No question, generate the SPARQL according to the combination of true propositions by using the ASK WHERE template;

when the question is a Normal question, generate the SPARQL according to the combination of true propositions by using the SELECT ?url WHERE template; and when the question is a Numeric question, generate the SPARQL according to the combination of true propositions by using the SELECT ?url WHERE template, or when a numeric answer cannot be obtained for the SPARQL generated by using the SELECT ?url WHERE template, generate the SPARQL by using the SELECT COUNT(?url) WHERE template.

Optionally, in another embodiment, the phrase detection unit 502 is specifically configured to:

use word sequences in the question as the first candidate phrases, where the word sequences satisfy:

all consecutive non-stop words in the word sequence begin with a capital letter, or if all consecutive non-stop words in the word sequence do not begin with a capital letter, a length of the word sequence is less than four;

a part of speech of a head word of the word sequence is jj or nn or rb or vb, where jj is an adjective, nn is a noun, rb is an adverb, and vb is a verb; and all words included in the word sequence are not stop words.

Optionally, in another embodiment, the device 500 may be a server of the knowledge base.

The device 500 can implement each process implemented by a device in the embodiments shown in FIG. 1 to FIG. 5. To avoid repetition, details are not described herein again.

Figure 7:
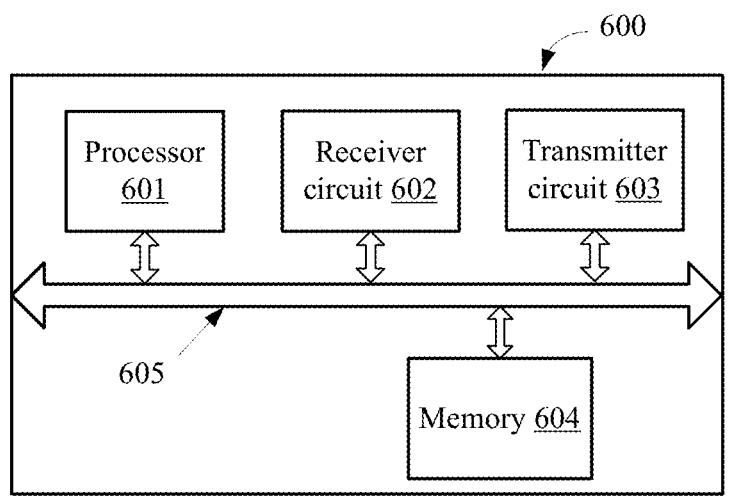
FIG. 7 is a block diagram of a device for parsing a question according to another embodiment of the present application.

FIG. 7 is a block diagram of a device for parsing a question according to another embodiment of the present application. A device 600 shown in FIG. 7 includes a processor 601, a receiver circuit 602, a transmitter circuit 603, and a memory 604.

The receiver circuit 602 is configured to receive a question entered by a user.

The processor 601 is configured to perform phrase detection on the question received by the receiver circuit 602 to determine first candidate phrases.

The processor 601 is further configured to map the first candidate phrases to first resource items in a knowledge base, where the first resource items have consistent semantic meanings with the first candidate phrases.

The processor 601 is further configured to determine values of observed predicates and possible question parse spaces according to the first candidate phrases and the first resource items, where the observed predicates are used to indicate features of the first candidate phrases, features of the first resource items, and a relationship between the first candidate phrases and the first resource items, points in the possible question parse spaces are proposition sets, and truth or falsity of propositions in the proposition sets are represented by values of hidden predicates.

The processor 601 is further configured to: perform uncertain inference on each proposition set in the possible question parse spaces according to the values that are of the observed predicates and the values of the hidden predicates, and calculate confidence of each proposition set.

The receiver circuit 602 is further configured to acquire a combination of true propositions in a proposition set whose confidence satisfies a preset condition, where the true propositions are used to indicate search phrases selected from the first candidate phrases, search resource items selected from the first resource items, and features of the search resource items.

The processor 601 is further configured to generate a formal query statement according to the combination of true propositions.

In this embodiment of the present application, uncertain inference is performed by using observed predicates and hidden predicates, and a natural language question can be converted into a formal query statement. In addition, in this embodiment of the present application, an uncertain inference method can be applied to a knowledge base in any field, and has field extensibility. Therefore, it is unnecessary to manually configure a conversion rule for a knowledge base.

Components in the device 600 are coupled together by using a bus system 605, where the bus system 605 includes a power bus, a control bus, a status signal bus, in addition to a data bus. However, for clear description, various buses in FIG. 7 are marked as the bus system 605.

The foregoing method disclosed in this embodiment of the present application may be applied in the processor 601 or implemented by the processor 601. The processor 601 may be an integrated circuit chip, and has a signal processing capability. In an implementation process, each step of the foregoing method may be completed by using an integrated logic circuit of hardware in the processor 601 or an instruction in a form of software. The processor 601 may be a general purpose processor, a digital signal processor (DSP), an application-specific integrated circuit (ASIC), a field programmable gate array (FPGA), or another programmable logical device, discrete gate or transistor logic device, or discrete hardware component. The processor may implement or execute each method, step, and logic block diagram disclosed in this embodiment of the present application. The general purpose processor may be a microprocessor or the processor may be any conventional processor and the like. The steps of the method disclosed with reference to this embodiment of the present application may be directly executed and completed by a hardware decoding processor, or executed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 604, and the processor 601 reads information in the memory 604 and completes the steps in the foregoing methods in combination with hardware of the processor.

It may be understood that the memory 604 in this embodiment of the present application may be a volatile memory or non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and it is used as an external high-speed cache. According to an exemplary description rather than limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a Direct Rambus (DR) RAM. The memory 604 in the system and method described in this specification is intended to include but is not limited to these and memories of any other appropriate types.

It may be understood that these embodiments described in the specification may be implemented by hardware, software, firmware, middleware, micro code, or a combination thereof. For hardware implementation, a processing unit may be implemented in one or more application specific integrated circuits (ASIC), a Digital Signal Processor (DSP), a digital signal processing device (DSPD), a programmable logic device (PLD), a field-programmable gate array (FPGA), a general purpose processor, a controller, a micro controller, other electronic units used to execute functions described in this application, or a combination thereof.

When the embodiments are implemented in the software, firmware, middleware, micro code, program code, or code segment, they may be stored, for example, in a machine-readable medium of a storage component. The code segment may indicate any combination of a process, a function, a subprogram, a program, a routine, a subroutine, a module, a software group, a class, an instruction, a data structure, or a program statement. The code segment may be coupled into another code segment or hardware circuit by transferring and/or receiving information, data, independent variables, parameters, or content of the memory. Any appropriate mode including memory sharing, message transfer, token transfer, network transmission, or the like may be used to transfer, forward, or send the information, independent variables, parameters, data, or the like.

For software implementation, the technology described in the specification may be implemented by using modules (for example, processes, functions, and the like) that execute the functions in the specification. The software code may be stored in a memory unit and executed by the processor. The memory unit may be implemented in the processor or outside the processor. In the latter case, the memory unit may be coupled into the processor in a communication mode by various means known in the art.

Optionally, in an embodiment, the uncertain inference is based on a Markov logic network MLN, where the MLN includes a predefined first-order formula and a weight of the first-order formula.

In this embodiment of the present application, the memory 604 may be configured to store resource items, types of the resource items, and the like. The memory 604 may be further configured to store the first-order formula. The memory 604 may be further configured to store a SPARQL template.

Optionally, in another embodiment,
the receiver circuit 602 is further configured to acquire multiple natural language questions from the knowledge base;
the processor 601 is further configured to perform phrase detection on the question to determine the first candidate phrases;
the processor 601 is further configured to map the second candidate phrases to second resource items in the knowledge base, where the second resource items have consistent semantic meanings with the second candidate phrases;
the processor 601 is further configured to determine, according to the second candidate phrases and the second resource items, values of observed predicates corresponding to the multiple natural language questions;
the receiver circuit 602 is further configured to acquire hand-labeled values of hidden predicates corresponding to the multiple natural language questions; and
the processor 601 is further configured to: create an undirected graph according to the values of the observed predicates corresponding to the multiple natural language questions, the values of the hidden predicates corresponding to the multiple natural language questions, and the first-order formula, and determine the weight of the first-order formula through training.

Optionally, in another embodiment, the first-order formula includes a Boolean formula and a weighted formula, a weight of the Boolean formula is $+\infty$, a weight of the weighted formula is a weighted formula weight, and the hand-labeled values of the hidden predicates corresponding to the multiple natural language questions satisfy the Boolean formula; and
the processor 601 is specifically configured to: create the undirected graph according to the values of the observed predicates corresponding to the multiple natural language questions, the values of the hidden predicates corresponding to the multiple natural language questions, and the first-order formula, and determine the weight of the weighted formula through training.

Optionally, in another embodiment, the processor 601 is specifically configured to:
create the undirected graph according to the values of the observed predicates corresponding to the multiple natural language questions, the values of the hidden predicates corresponding to the multiple natural language questions, and the first-order formula, and determine the weight of the first-order formula by using a margin infused relaxed algorithm MIRA.

Optionally, in another embodiment, the MLN is indicated by M, the first-order formula is indicated by $\phi_i$, the weight of the first-order formula is indicated by $w_i$, and the proposition set is indicated by y; and the processor 601 is specifically configured to:

calculate the confidence of each proposition set according to $$p(y) = \frac{1}{Z}\exp\left(\sum_{(\phi_i, w_i) \in M} w_i \sum_{c \in C^{n\phi_i}} f_c^{\phi_i}(y)\right),$$

where, Z is a normalization constant, $C^{n\phi_i}$ is a sub-formula set corresponding to the first-order formula $\phi_i$, c is a sub-formula in the sub-formula set $C^{n\phi_i}$, $f_c^{\phi_i}$ is a binary feature function, and $f_c^{\phi_i}(y)$ indicates truth or falsity of the first-order formula in the proposition set y.

Optionally, in another embodiment, the receiver circuit 602 is specifically configured to: determine a proposition set whose confidence value is largest, and acquire a combination of true propositions in the proposition set whose confidence value is largest.

Optionally, in another embodiment, the features of the first candidate phrases include positions of the first candidate phrases in the question, parts of speech of head words of the first candidate phrases, and tags on a dependency path between every two of the first candidate phrases;

the features of the first resource items include types of the first resource items, a correlation value between every two of the first resource items, and a parameter matching relationship between every two of the first resource items;

the relationship between the first candidate phrases and the first resource items includes prior matching scores between the first candidate phrases and the first resource items; and the processor 601 is specifically configured to:

determine the positions of the first candidate phrases in the question;

determine the parts of speech of the head words of the first candidate phrases by using a Stanford part-of-speech tagging tool;

determine the tags on the dependency path between every two of the first candidate phrases by using a Stanford dependency syntax parser tool;

determine the types of the first resource items from the knowledge base, where the types are entity or class or relation;

determine the parameter matching relationship between every two of the first resource items from the knowledge base;

use a similarity coefficient between every two of the first resource items as the correlation value between every two of the first resource items; and calculate the prior matching scores between the first candidate phrases and the first resource items, where the prior matching scores are used to indicate probabilities that the first candidate phrases are mapped to the first resource items.

Optionally, in another embodiment, the formal query statement is a Simple Protocol and Resource Description Framework Query Language (SPARQL).

Optionally, in another embodiment, the processor 601 is specifically configured to:

generate the SPARQL according to the combination of true propositions by using a SPARQL template.

Optionally, in another embodiment, the SPARQL template includes an ASK WHERE template, a SELECT COUNT(?url) WHERE template, and a SELECT ?url WHERE template; and the processor 601 is specifically configured to:

when the question is a Yes/No question, generate the SPARQL according to the combination of true propositions by using the ASK WHERE template;

when the question is a Normal question, generate the SPARQL according to the combination of true propositions by using the SELECT ?url WHERE template; and when the question is a Numeric question, generate the SPARQL according to the combination of true propositions by using the SELECT ?url WHERE template, or when a numeric answer cannot be obtained for the SPARQL generated by using the SELECT ?url WHERE template, generate the SPARQL by using the SELECT COUNT(?url) WHERE template.

Optionally, in another embodiment, the processor 601 is specifically configured to:

use word sequences in the question as the first candidate phrases, where the word sequences satisfy:

all consecutive non-stop words in the word sequence begin with a capital letter, or if all consecutive non-stop words in the word sequence do not begin with a capital letter, a length of the word sequence is less than four;

a part of speech of a head word of the word sequence is jj or nn or rb or vb, where jj is an adjective, nn is a noun, rb is an adverb, and vb is a verb; and all words included in the word sequence are not stop words.

Optionally, in another embodiment, the device 600 may be a server of the knowledge base.

The device 600 can implement each process implemented by a device in the embodiments shown in FIG. 1 to FIG. 5. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for converting a natural language question into a query statement for querying a knowledge base, comprising:
    receiving the question provided by a user;
    performing phrase detection on the question to determine a set of one or more first candidate phrases;
    mapping the first candidate phrases to a set of first resource items in the knowledge base, wherein the first resource items have consistent semantic meanings with the first candidate phrases;
    determining values of observed predicates and a possible question parse space according to the first candidate phrases and the first resource items, wherein the observed predicates represent features of the first candidate phrases, features of the first resource items, and a relationship between the first candidate phrases and the first resource items, and wherein points in the possible question parse space form multiple proposition sets, and truth or falsity of propositions in the proposition sets are represented by values of hidden predicates;
    performing uncertain inference on each proposition set in the possible question parse space according to the values of the observed predicates and the values of the hidden predicates, and calculating a confidence degree of each proposition set;
    acquiring a combination of true propositions in a proposition set whose confidence degree satisfies a preset condition, wherein the true propositions represent search phrases selected from the first candidate phrases, search resource items selected from the first resource items, and features of the selected search resource items; and
    generating a query statement according to the combination of true propositions for querying the knowledge base.

2. The method according to claim 1, wherein the uncertain inference is based on a Markov logic network (MLN), wherein the MLN comprises a predefined first-order formula and a weight of the first-order formula.

3. The method according to claim 2, wherein before the receiving the question provided by the user, the method further comprises:
    acquiring multiple natural language questions from the knowledge base;
    performing phrase detection on the multiple natural language questions to determine a set of second candidate phrases of the multiple natural language questions;
    mapping the second candidate phrases to a set of second resource items in the knowledge base, wherein the second resource items have consistent semantic meanings with the second candidate phrases;
    determining, according to the second candidate phrases and the second resource items, values of observed predicates corresponding to the multiple natural language questions;
    acquiring hand-labeled values of hidden predicates corresponding to the multiple natural language questions; and
    creating an undirected graph according to the values of the observed predicates corresponding to the multiple natural language questions, the values of the hidden predicates corresponding to the multiple natural language questions, and the first-order formula, and determining the weight of the first-order formula through training.

4. The method according to claim 3, wherein the first-order formula comprises a Boolean formula and a weighted formula, a weight of the Boolean formula is $+\infty$, a weight of the weighted formula is a weighted formula weight, and the hand-labeled values of the hidden predicates corresponding to the multiple natural language questions satisfy the Boolean formula; and
    wherein creating the undirected graph according to the values of the observed predicates corresponding to the multiple natural language questions, the values of the hidden predicates corresponding to the multiple natural language questions, and the first-order formula, and determining the weight of the first-order formula through training comprises:
        creating the undirected graph according to the values of the observed predicates corresponding to the multiple natural language questions, the values of the hidden predicates corresponding to the multiple natural language questions, and the first-order formula, and determining the weight of the weighted formula through training.

5. The method according to claim 3, wherein creating the undirected graph according to the values of the observed predicates corresponding to the multiple natural language questions, the values of the hidden predicates corresponding to the multiple natural language questions, and the first-order formula, and determining the weight of the first-order formula through training comprises:
creating the undirected graph according to the values of the observed predicates corresponding to the multiple natural language questions, the values of the hidden predicates corresponding to the multiple natural language questions, and the first-order formula, and determining the weight of the first-order formula by using a margin infused relaxed algorithm (MIRA).

6. The method according to claim 2 wherein the MLN is indicated by M, the first-order formula is indicated by $\phi_i$, the weight of the first-order formula is indicated by $w_i$, and the proposition set is indicated by y; and
wherein performing uncertain inference on each proposition set in the possible question parse spaces according to the values of the observed predicates and the values of the hidden predicates, and calculating confidence of each proposition set comprises:
calculating the confidence of each proposition set according to the following formula:

$$p(y) = \frac{1}{Z} \exp\left( \sum_{(\phi_i, w_i) \in M} w_i \sum_{c \in C^{n\phi_i}} f_c^{\phi_i}(y) \right);$$

wherein
Z is a normalization constant, $C^{n\phi_i}$ is a sub-formula set corresponding to the first-order formula $\phi_i$, c is a sub-formula in the sub-formula set $C^{n\phi_i}$, $f_c^{\phi_i}$ is a binary feature function, and $f_c^{\phi_i}(y)$ indicates truth or falsity of the first-order formula in the proposition set y.

7. The method according to claim 1, wherein acquiring the combination of true propositions in a proposition set whose confidence satisfies a preset condition comprises:
determining a proposition set whose confidence value is largest, and acquiring a combination of true propositions in the proposition set whose confidence value is largest.

8. The method according to claim 1, wherein:
the features of the first candidate phrases comprise positions of the first candidate phrases in the question, parts of speech of head words of the first candidate phrases, and tags on a dependency path between every two of the first candidate phrases;
the features of the first resource items comprise types of the first resource items, a correlation value between every two of the first resource items, and a parameter matching relationship between every two of the first resource items; and
the relationship between the first candidate phrases and the first resource items comprises prior matching scores between the first candidate phrases and the first resource items;
wherein determining values of observed predicates according to the first candidate phrases and the first resource items comprises:

determining the positions of the first candidate phrases in the question;
determining the parts of speech of the head words of the first candidate phrases by using a Stanford part-of-speech tagging tool;
determining the tags on the dependency path between every two of the first candidate phrases by using a Stanford dependency syntax parser tool;
determining the types of the first resource items from the knowledge base, wherein the types are entity or class or relation;
determining the parameter matching relationship between every two of the first resource items from the knowledge base;
using a similarity coefficient between every two of the first resource items as the correlation value between every two of the first resource items; and
calculating the prior matching scores between the first candidate phrases and the first resource items, wherein the prior matching scores are used to indicate probabilities that the first candidate phrases are mapped to the first resource items.

9. The method according to claim 1, wherein the query statement is a Simple Protocol and Resource Description Framework Query Language (SPARQL) statement.

10. The method according to claim 9, wherein generating the query statement according to the combination of true propositions comprises:
generating the SPARQL statement according to the combination of true propositions by using a SPARQL template.

11. The method according to claim 10, wherein the SPARQL template comprises an ASK WHERE template, a SELECT COUNT(?url) WHERE template, and a SELECT ?url WHERE template; and
wherein generating the SPARQL statement according to the combination of true propositions by using a SPARQL template comprises:
when the question is a Yes/No question, generating the SPARQL statement according to the combination of true propositions by using the ASK WHERE template;
when the question is a Normal question, generating the SPARQL statement according to the combination of true propositions by using the SELECT ?url WHERE template; and
when the question is a Numeric question, generating the SPARQL statement according to the combination of true propositions by using the SELECT ?url WHERE template, or
when a numeric answer cannot be obtained for the SPARQL statement generated by using the SELECT ?url WHERE template, generating the SPARQL statement by using the SELECT COUNT(?url) WHERE template.

12. The method according to claim 1, wherein performing the phrase detection on the question to determine first candidate phrases comprises:
using word sequences in the question as the first candidate phrases, wherein the word sequences satisfy any one of the following:
all consecutive non-stop words in the word sequence begin with a capital letter, or if all consecutive non-stop words in the word sequence do not begin with a capital letter, a length of the word sequence is less than four;
a part of speech of a head word of the word sequence is jj or nn or rb or vb, wherein jj is an adjective, nn is a noun, rb is an adverb, and vb is a verb; and all words comprised in the word sequence are not stop words.

13. A device, comprising:
a receiver circuit, configured to receive a natural language question entered by a user;
a memory storing program instructions for execution by a processor, wherein the program instructions comprise instructions for converting the natural language question into a query statement for querying a knowledge base; and the processor, by executing the instructions, configured to:
  perform phrase detection on the question received by the receiving circuit to determine a set of first candidate phrases;
  map the first candidate phases to a set of first resource items in the knowledge base, wherein the first resource items have consistent semantic meanings with the first candidate phrases;
  determine values of observed predicates and possible question parse spaces according to the first candidate phrases and the first resource items, wherein the observed predicates are used to indicate features of the first candidate phrases, features of the first resource items, and a relationship between the first candidate phrases and the first resource items, and wherein points in the possible question parse spaces are proposition sets, and truth or falsity of propositions in the proposition sets are represented by values of hidden predicates;
  perform uncertain inference on each proposition set in the possible question parse spaces according to the values of the observed predicates and the values of the hidden predicates, and calculate confidence of each proposition set;
  acquire a combination of true propositions in a proposition set whose confidence satisfies a preset condition, wherein the true propositions are used to indicate search phrases selected from the first candidate phrases, search resource items selected from the first resource items, and features of the search resource items; and
  generate a formal query statement according to the combination of the true propositions.

14. The device according to claim 13, wherein the uncertain inference is based on a Markov logic network (MLN), wherein the MLN comprises a predefined first-order formula and a weight of the first-order formula.

15. The device according to claim 14, wherein the processor, by executing the instructions, is further configured to:
  acquire multiple natural language questions from the knowledge base;
  perform phrase detection on the multiple natural language questions to determine a set of second candidate phrases;
  map the second candidate phrases to a set of second resource items in the knowledge base, wherein the second resource items have consistent semantic meanings with the second candidate phrases;
  determine, according to the second candidate phrases and the second resource items, values of observed predicates corresponding to the multiple natural language questions;
  acquire hand-labeled values of hidden predicates corresponding to the multiple natural language questions; and
  create an undirected graph according to the values of the observed predicates corresponding to the multiple natural language questions, the values of the hidden predicates corresponding to the multiple natural language questions, and the first-order formula, and determine the weight of the first-order formula through training.

16. The device according to claim 15, wherein the first-order formula comprises a Boolean formula and a weighted formula, a weight of the Boolean formula is $+\infty$, a weight of the weighted formula is a weighted formula weight, and the hand-labeled values of the hidden predicates corresponding to the multiple natural language questions satisfy the Boolean formula; and
wherein in creating the undirected graph according to the values of the observed predicates corresponding to the multiple natural language questions, the values of the hidden predicates corresponding to the multiple natural language questions, and the first-order formula, and in determining the weight of the first-order formula through training, the processor is configured to:
  create the undirected graph according to the values of the observed predicates corresponding to the multiple natural language questions, the values of the hidden predicates corresponding to the multiple natural language questions, and the first-order formula, and determine the weight of the weighted formula through training.

17. The device according to claim 15, wherein in creating the undirected graph according to the values of the observed predicates corresponding to the multiple natural language questions, the values of the hidden predicates corresponding to the multiple natural language questions, and the first-order formula, and in determining the weight of the first-order formula through training, the processor is configured to:
  create the undirected graph according to the values of the observed predicates corresponding to the multiple natural language questions, the values of the hidden predicates corresponding to the multiple natural language questions, and the first-order formula, and determine the weight of the first-order formula by using a margin infused relaxed algorithm (MIRA).

18. A non-transitory computer-readable storage medium storing program instructions for execution by a computer, wherein the instructions cause the computer to perform a process of converting a natural language question into a query statement for querying a knowledge base that comprises:
  performing phrase detection on the question entered by a user to determine a set of first candidate phrases;
  mapping the first candidate phrases to a set of first resource items in the knowledge base, wherein the first resource items have consistent semantic meanings with the first candidate phrases;
  determining values of observed predicates and possible question parse spaces according to the first candidate phrases and the first resource items, wherein the observed predicates represent features of the first candidate phrases, features of the first resource items, and a relationship between the first candidate phrases and the first resource items, and wherein points in the possible question parse spaces are proposition sets, and truth or falsity of propositions in the proposition sets are represented by values of hidden predicates;
  performing uncertain inference on each proposition set in the possible question parse spaces according to the values of the observed predicates and the values of the hidden predicates, and calculating confidence of each proposition set;

acquiring a combination of true propositions in a proposition set and whose confidence satisfies a preset condition, wherein the true propositions are used to indicate search phrases selected from the first candidate phrases, search resource items selected from the first resource items, and features of the search resource items; and generating a formal query statement according to the combination of the true propositions.

19. The non-transitory computer-readable storage medium according to claim 18, wherein acquiring the combination of true propositions in a proposition set whose confidence satisfies a preset condition comprises: determining a proposition set whose confidence value is largest, and acquiring a combination of true propositions in the proposition set whose confidence value is largest.

20. The non-transitory computer-readable storage medium according to claim 18, wherein performing the phrase detection on the question to determine first candidate phrases comprises:

using word sequences in the question as the first candidate phrases, wherein the word sequences satisfy any one of the following:

all consecutive non-stop words in the word sequence begin with a capital letter, or if all consecutive non-stop words in the word sequence do not begin with a capital letter, a length of the word sequence is less than four;

a part of speech of a head word of the word sequence is jj or nn or rb or vb, wherein jj is an adjective, nn is a noun, rb is an adverb, and vb is a verb; and all words comprised in the word sequence are not stop words.

* * * * *